United States Patent
Lim et al.

(10) Patent No.: US 10,631,259 B2
(45) Date of Patent: Apr. 21, 2020

(54) METHOD AND TERMINAL FOR APPLYING ON/OFF POWER TIME MASK FOR V2X COMMUNICATION

(71) Applicant: LG ELECTRONICS INC., Seoul (KR)

(72) Inventors: Suhwan Lim, Seoul (KR); Yoonoh Yang, Seoul (KR); Sangwook Lee, Seoul (KR); Manyoung Jung, Seoul (KR); Jinyup Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/308,295

(22) PCT Filed: Jun. 2, 2017

(86) PCT No.: PCT/KR2017/005759
§ 371 (c)(1),
(2) Date: Dec. 7, 2018

(87) PCT Pub. No.: WO2017/222206
PCT Pub. Date: Dec. 28, 2017

(65) Prior Publication Data
US 2019/0141650 A1 May 9, 2019

Related U.S. Application Data

(60) Provisional application No. 62/455,624, filed on Feb. 7, 2017, provisional application No. 62/353,038, filed on Jun. 22, 2016.

(51) Int. Cl.
*H04W 72/04* (2009.01)
*H04L 27/26* (2006.01)
(Continued)

(52) U.S. Cl.
CPC ......... *H04W 56/001* (2013.01); *H04L 5/1469* (2013.01); *H04L 27/2607* (2013.01);
(Continued)

(58) Field of Classification Search
CPC ....... H04W 56/001; H04W 4/40; H04W 4/44; H04W 4/46; H04L 27/2607; H04L 5/1469;
(Continued)

(56) References Cited

U.S. PATENT DOCUMENTS

| | | |
|---|---|---|
| 2011/0039583 A1 | 2/2011 | Frank et al. |
| 2017/0230939 A1 | 8/2017 | Rudolf et al. |

(Continued)

FOREIGN PATENT DOCUMENTS

| | | |
|---|---|---|
| KR | 10-2010-0062209 A | 6/2010 |
| WO | WO 2015/114052 A1 | 8/2015 |

(Continued)

*Primary Examiner* — Edan Orgad
*Assistant Examiner* — Vanneilian Lalchinthang
(74) *Attorney, Agent, or Firm* — Birch, Stewart, Kolasch & Birch, LLP

(57) ABSTRACT

One embodiment of the present invention provides a method for a vehicle-to-everything (V2X) communication terminal applying an on/off power time mask. The method may comprise the step of applying an on/off power time mask in a case where a primary sidelink synchronization signal (PSSS), a secondary sidelink synchronization signal (SSSS) and a physical broadcast channel (PSBCH) are transmitted from one subframe. Here, the on/off time mask may designate an observation period between an SSSS symbol and an adjacent PSSS symbol in the subframe. Power for the PSSS may be turned off at 20 microseconds (μs) before the start of a first SSSS symbol in the subframe. Further, power for the SSSS may be turned on at 20 μs after before the start of the first SSSS symbol in the subframe.

8 Claims, 23 Drawing Sheets

(51) Int. Cl.
| | |
|---|---|
| *H04W 56/00* | (2009.01) |
| *H04W 52/28* | (2009.01) |
| *H04W 52/24* | (2009.01) |
| *H04W 4/40* | (2018.01) |
| *H04W 52/14* | (2009.01) |
| *H04W 52/36* | (2009.01) |
| *H04W 72/10* | (2009.01) |
| *H04W 4/44* | (2018.01) |
| *H04W 4/70* | (2018.01) |
| *H04W 76/11* | (2018.01) |
| *H04L 5/14* | (2006.01) |
| *H04W 84/04* | (2009.01) |
| *H04L 5/00* | (2006.01) |

(52) U.S. Cl.
CPC ............... *H04W 4/40* (2018.02); *H04W 4/44* (2018.02); *H04W 4/70* (2018.02); *H04W 52/146* (2013.01); *H04W 52/246* (2013.01); *H04W 52/281* (2013.01); *H04W 52/367* (2013.01); *H04W 72/044* (2013.01); *H04W 72/0446* (2013.01); *H04W 72/0453* (2013.01); *H04W 72/10* (2013.01); *H04W 76/11* (2018.02); *H04L 5/001* (2013.01); *H04W 84/042* (2013.01)

(58) Field of Classification Search
CPC ..... H04L 5/0007; H04L 5/001; H04L 5/0053; H04B 7/02
USPC ........................................................ 370/329
See application file for complete search history.

(56) References Cited

U.S. PATENT DOCUMENTS

| | | |
|---|---|---|
| 2018/0213489 A1 | 7/2018 | Andou et al. |
| 2019/0090218 A1 | 3/2019 | Noh et al. |

FOREIGN PATENT DOCUMENTS

| | | |
|---|---|---|
| WO | WO 2016/036141 A1 | 3/2016 |
| WO | WO 2016/048097 A1 | 3/2016 |

METHOD AND TERMINAL FOR APPLYING ON/OFF POWER TIME MASK FOR V2X COMMUNICATION

CROSS REFERENCE TO RELATED APPLICATIONS

This application is the National Phase of PCT/KR2017/005759 filed on Jun. 2, 2017, which claims priority under 35 U.S.C. § 119(e) to U.S. Provisional Application Nos. 62/353,038 filed on Jun. 22, 2016 and 62/455,624 filed on Feb. 7, 2017, all of which are hereby expressly incorporated by reference into the present application.

BACKGROUND OF THE INVENTION

Field of the Invention

The present invention relates to mobile communication.

Related Art

3rd generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) evolved from the 3GPP LTE.

In LTE/LTE-A, a physical channel of LTE may be classified into a downlink channel, i.e., a PDSCH (Physical Downlink Shared Channel) and a PDCCH (Physical Downlink Control Channel), and an uplink channel, i.e., a PUSCH (Physical Uplink Shared Channel) and a PUCCH (Physical Uplink Control Channel).

Meanwhile, due to an increase in user requirements for SNS (Social Network Service), communication among terminals physically close to each other, that is, D2D (Device to Device) communication is required.

D2D communication may be performed among terminals located in coverage of the base station, or among terminals located out of coverage of the base station. Further, D2D communication may be performed between a terminal located out of coverage of the base station and a terminal located in coverage of the base station.

The above-mentioned contents on D2D may also be applied to vehicle-to-everything (V2X). The V2X collectively refers to communication technology through all interfaces with vehicles. The V2X implementations may be, for example, vehicle-to-vehicle (V2V), vehicle-to-infrastructure (V2I), vehicle-to-person (V2P), vehicle-to-network (V2N), or the like.

Meanwhile, as described above, the D2D communication (or ProSe communication) and the V2X communication are proposed. However, previously, on/off time mask for the, the D2D communication (or ProSe communication) and the V2X communication are not proposed.

SUMMARY OF THE INVENTION

Accordingly, an object of the present invention is to propose on/off time mask for a V2X communication in order to solve the above-mentioned problems.

To achieve the foregoing purposes, the disclosure of the present invention proposes a method for applying on/off power time mask. The method may be performed by a vehicle to everything (V2X) communication terminal and comprise: applying an on/off power time mask for a primary sidelink synchronization signal (PSSS), a secondary sidelink synchronization signal (SSSS) and a physical broadcast channel (PBCH). The on/off power time mask may specify an observation period between SSSS and adjacent PSSS symbols in a subframe. A power of the PSSS may be turned off at a 20 μs before a starting point of a first SSSS symbol in the subframe. A power of the SSSS may be turned on at 20 μs after the starting point of the first SSSS symbol in the subframe.

The power of the PSSS may be turned on at 20 μs after a starting point of the subframe.

The power of the SSSS may be turned on until an ending point of a second SSSS symbol in the subframe.

A last symbol in the subframe may be punctured to create a guard period.

To achieve the foregoing purposes, the disclosure of the present invention proposes a vehicle to everything (V2X) communication terminal for applying on/off power time mask. comprising: a transceiver; and a processor configured to control the transceiver. The processor may apply an on/off power time mask for a primary sidelink synchronization signal (PSSS), a secondary sidelink synchronization signal (SSSS) and a physical broadcast channel (PBCH). The on/off power time mask may specify an observation period between SSSS and adjacent PSSS symbols in a subframe. A power of the PSSS may be turned off at a 20 μs before a starting point of a first SSSS symbol in the subframe. A power of the SSSS may be turned on at 20 μs after the starting point of the first SSSS symbol in the subframe.

According to the disclosure of the present invention, the problem of the conventional technology described above may be solved.

DESCRIPTION OF EXEMPLARY EMBODIMENTS

Figure 1:
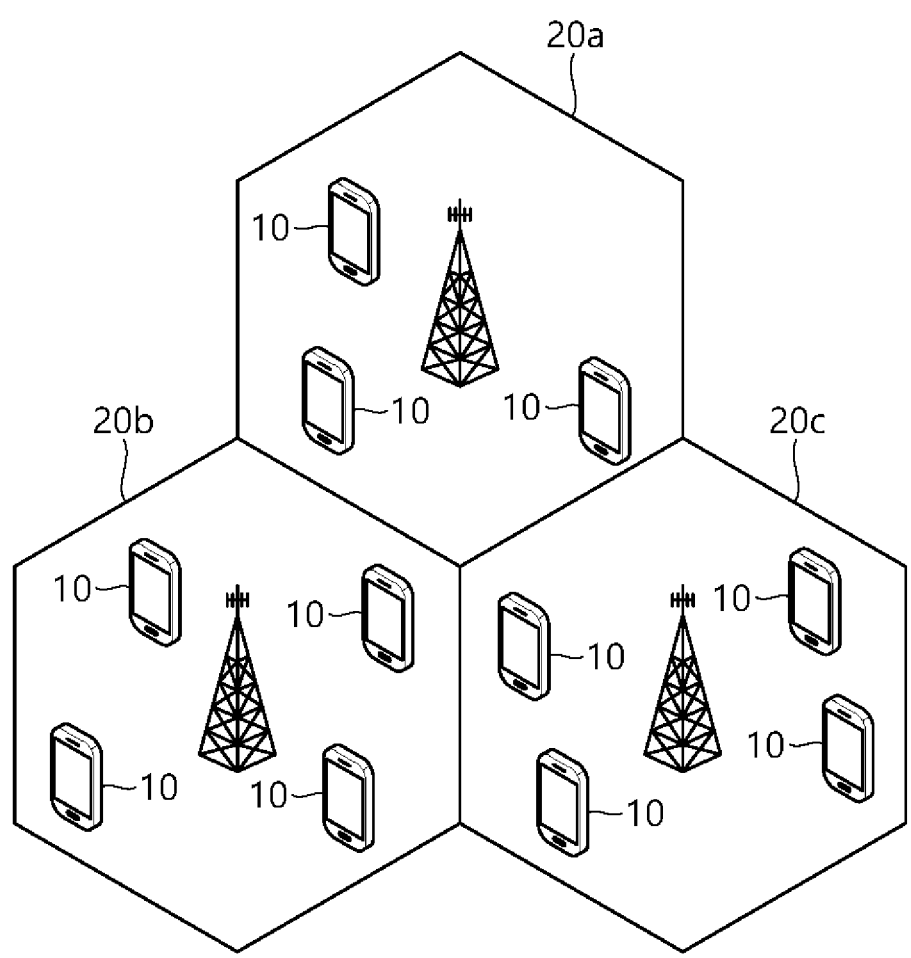
FIG. 1 is a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present invention includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present invention, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

FIG. 1 illustrates a wireless communication system.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE1 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response.

In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a sub-frame, the uplink transmission and the downlink transmission are performed in different sub-frames.

Hereinafter, the LTE system will be described in detail.

Figure 2:
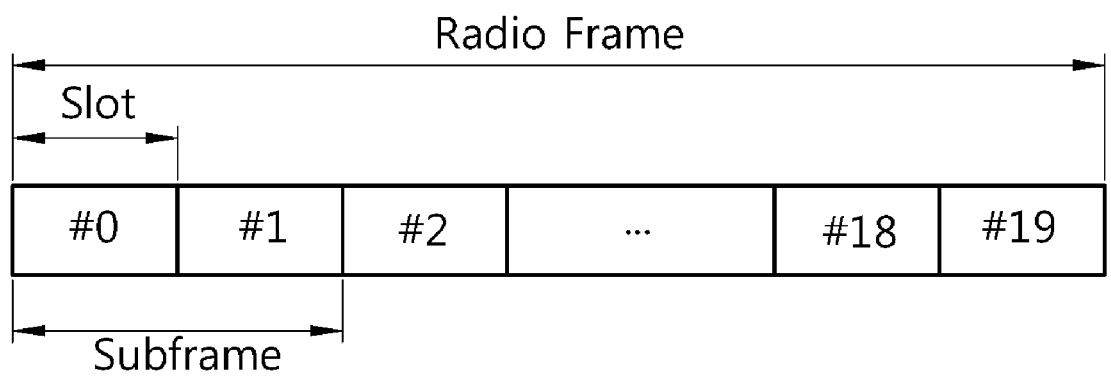
FIG. 2 illustrates a structure of a radio frame according to FDD in 3GPP LTE.

FIG. 2 shows a downlink radio frame structure according to FDD of 3rd generation partnership project (3GPP) long term evolution (LTE).

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

The structure of the radio frame is for exemplary purposes only, and thus the number of sub-frames included in the radio frame or the number of slots included in the sub-frame may change variously.

Meanwhile, one slot may include a plurality of orthogonal frequency division multiplexing (OFDM) symbols. The number of OFDM symbols included in one slot may vary depending on a cyclic prefix (CP). One slot includes 7 OFDM symbols in case of a normal CP, and one slot includes 6 OFDM symbols in case of an extended CP. Herein, since the 3GPP LTE uses orthogonal frequency division multiple access (OFDMA) in a downlink (DL), the The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) sub-frame and a UL (Uplink) co-exist in one radio frame. Table 1 shows an example of configuration of a radio frame.

TABLE 1

| UL-DL configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL sub-frame, 'U' a UL sub-frame, and 'S' a special sub-frame. When receiving a UL-DL configuration from the base station, the terminal may be aware of whether a sub-frame is a DL sub-frame or a UL sub-frame according to the configuration of the radio frame.

TABLE 2

| Special subframe configuration | Normal CP in downlink | | | Extended CP in downlink | | |
|---|---|---|---|---|---|---|
| | | UpPTS | | | UpPTS | |
| | DwPTS | Normal CP in uplink | Extended CP in uplink | DwPTS | Normal CP in uplink | Extended CP in uplink |
| 0 | 6592*Ts | 2192*Ts | 2560*Ts | 7680*Ts | 2192*Ts | 2560*Ts |
| 1 | 19760*Ts | | | 20480*Ts | | |
| 2 | 21952*Ts | | | 23040*Ts | | |
| 3 | 24144*Ts | | | 25600*Ts | | |
| 4 | 26336*Ts | | | 7680*Ts | 4384*Ts | 5120*ts |
| 5 | 6592*Ts | 4384*Ts | 5120*ts | 20480*Ts | | |
| 6 | 19760*Ts | | | 23040*Ts | | |
| 7 | 21952*Ts | | | — | | |
| 8 | 24144*Ts | | | — | | |

OFDM symbol is only for expressing one symbol period in a time domain, and there is no limitation in a multiple access scheme or terminologies. For example, the OFDM symbol may also be referred to as another terminology such as a single carrier frequency division multiple access (SC-FDMA) symbol, a symbol period, etc.

Figure 3:
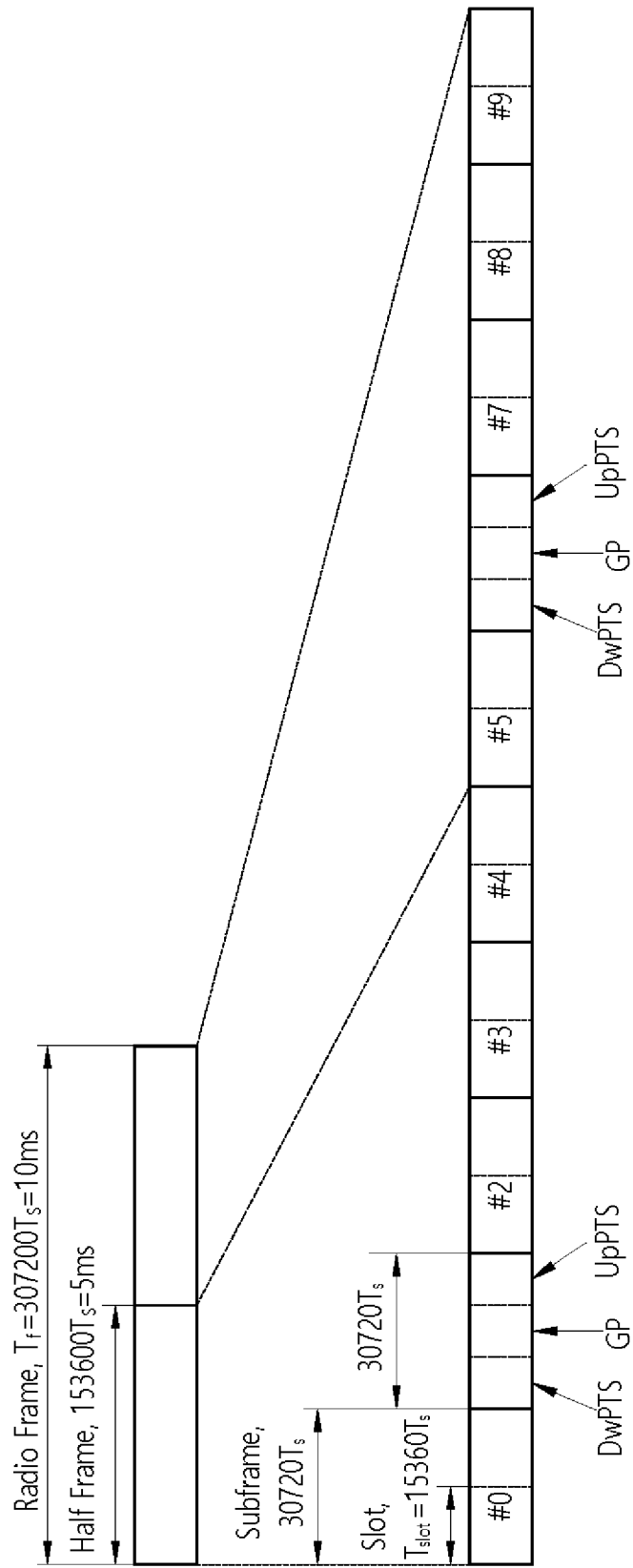
FIG. 3 illustrates a structure of a downlink radio frame according to TDD in the 3GPP LTE.

FIG. 3 illustrates the architecture of a downlink radio frame according to TDD in 3GPP LTE.

For this, 3GPP TS 36.211 V10.4.0 (2011-23) "Evolved Universal Terrestrial Radio Access (E-UTRA); Physical Channels and Modulation (Release 8)", Ch. 4 may be referenced, and this is for TDD (time division duplex).

Sub-frames having index #1 and index #6 are denoted special sub-frames, and include a DwPTS (Downlink Pilot Time Slot: DwPTS), a GP (Guard Period) and an UpPTS (Uplink Pilot Time Slot). The DwPTS is used for initial cell search, synchronization, or channel estimation in a terminal.

Figure 4:
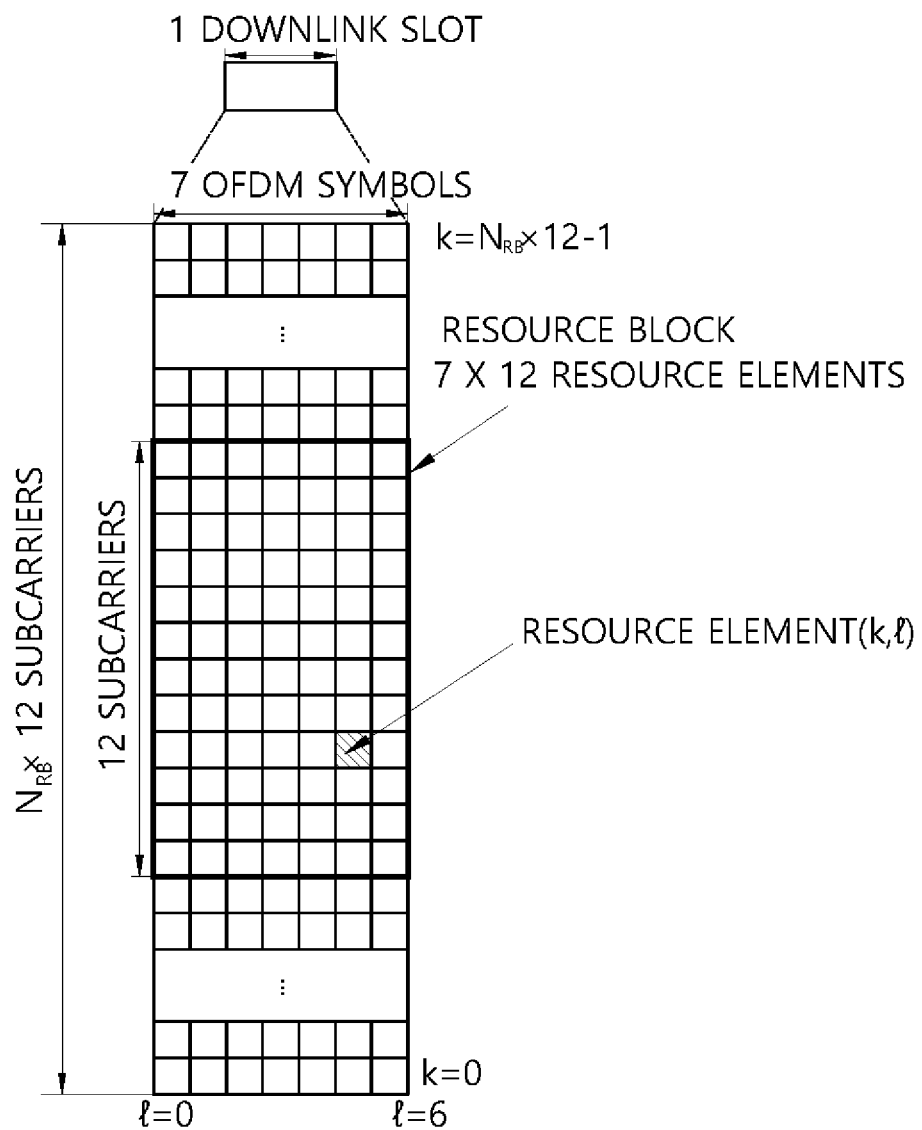
FIG. 4 is an exemplary diagram illustrating a resource grid for one uplink or downlink slot in the 3GPP LTE.

FIG. 4 illustrates an example resource grid for one uplink or downlink slot in 3GPP LTE.

Referring to FIG. 4, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

The resource block is a unit of resource allocation and includes a plurality of sub-carriers in the frequency domain. For example, if one slot includes seven OFDM symbols in the time domain and the resource block includes 12 sub-carriers in the frequency domain, one resource block may include 7×12 resource elements (REs).

Meanwhile, the number of sub-carriers in one OFDM symbol may be one of 128, 256, 512, 1024, 1536, and 2048.

In 3GPP LTE, the resource grid for one uplink slot shown in FIG. 4 may also apply to the resource grid for the downlink slot.

Figure 5:
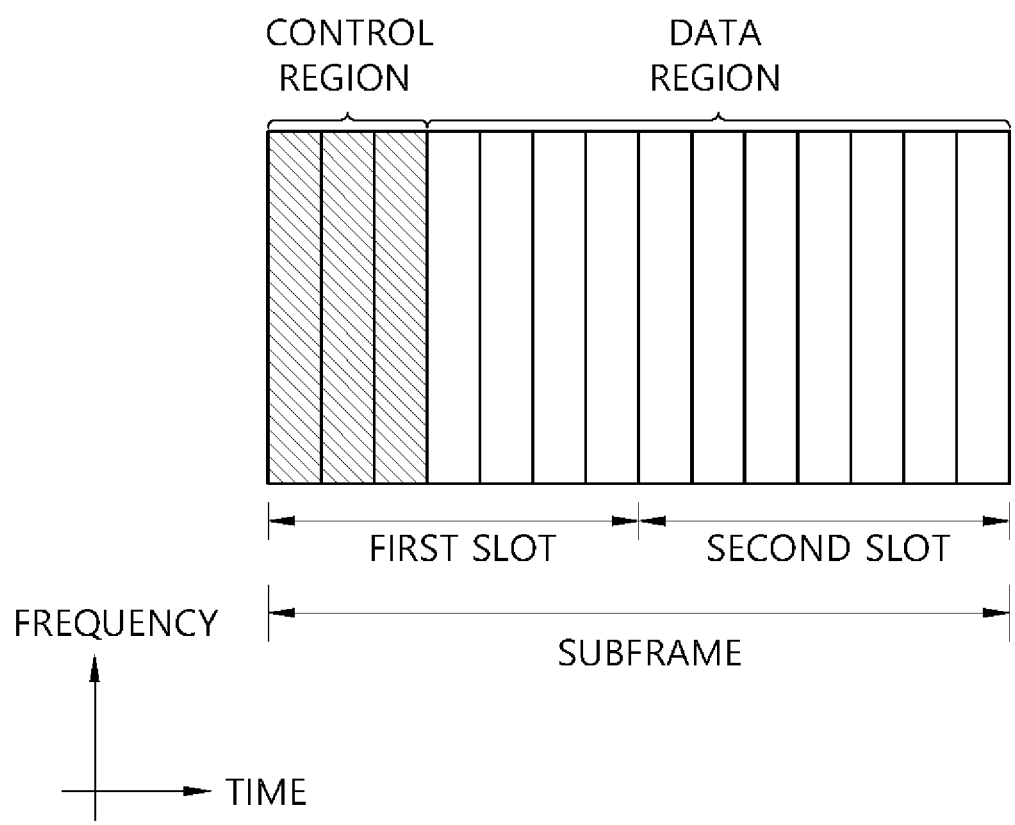
FIG. 5 illustrates a structure of a downlink subframe.

FIG. 5 illustrates the architecture of a downlink sub-frame.

In FIG. 5, assuming the normal CP, one slot includes seven OFDM symbols, by way of example.

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding. The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over internet protocol) and a set of transmission power control commands for individual UEs in some UE group, resource allocation of an upper layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

Control information transmitted through the PDCCH is referred to as downlink control information (DCI). The DCI may include resource allocation of the PDSCH (this is referred to as a DL grant), resource allocation of a PUSCH (this is referred to as a UL grant), a set of transmit power control commands for individual UEs in any UE group, and/or activation of a voice over Internet protocol (VoIP).

The base station determines a PDCCH format according to the DCI to be sent to the terminal and adds a CRC (cyclic redundancy check) to control information. The CRC is masked with a unique identifier (RNTI; radio network temporary identifier) depending on the owner or purpose of the PDCCH. In case the PDCCH is for a specific terminal, the terminal's unique identifier, such as C-RNTI (cell-RNTI), may be masked to the CRC. Or, if the PDCCH is for a paging message, a paging indicator, for example, P-RNTI (paging-RNTI) may be masked to the CRC. If the PDCCH is for a system information block (SIB), a system information identifier, SI-RNTI (system information-RNTI), may be masked to the CRC. In order to indicate a random access response that is a response to the terminal's transmission of a random access preamble, an RA-RNTI (random access-RNTI) may be masked to the CRC.

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

The uplink channels include a PUSCH, a PUCCH, an SRS (Sounding Reference Signal), and a PRACH (physical random access channel).

Figure 6:
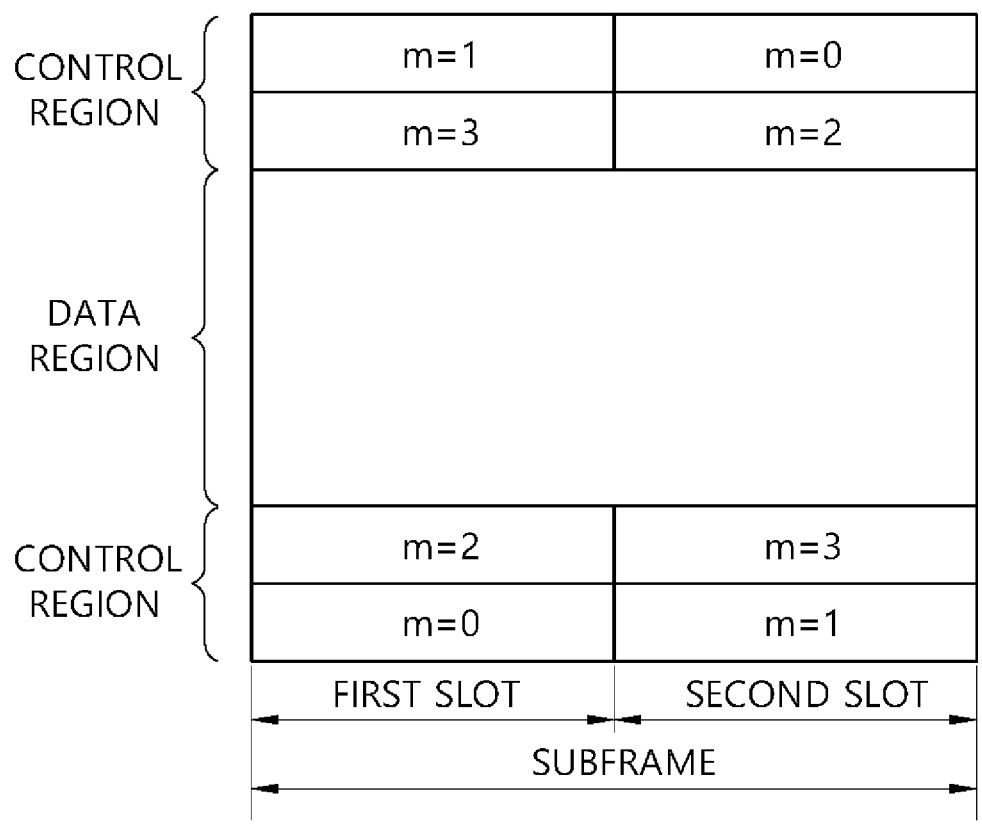
FIG. 6 illustrates the architecture of an uplink sub-frame in 3GPP LTE.

FIG. 6 illustrates the architecture of an uplink sub-frame in 3GPP LTE.

Referring to FIG. 6, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The terminal may obtain a frequency diversity gain by transmitting uplink control information through different sub-carriers over time. m is a location index that indicates a logical frequency domain location of a resource block pair assigned to the PUCCH in the sub-frame.

The uplink control information transmitted on the PUCCH includes an HARQ (hybrid automatic repeat request), an ACK (acknowledgement)/NACK (non-acknowledgement), a CQI (channel quality indicator) indicating a downlink channel state, and an SR (scheduling request) that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Or, the uplink data may be multiplexed data. The multiplexed data may be data obtained by multiplexing the transport block for the UL-SCH and control information. For example, the control information multiplexed with the data may include a CQI, a PMI (precoding matrix indicator), an HARQ, and an RI (rank indicator). Or, the uplink data may consist only of control information.

Figure 7:
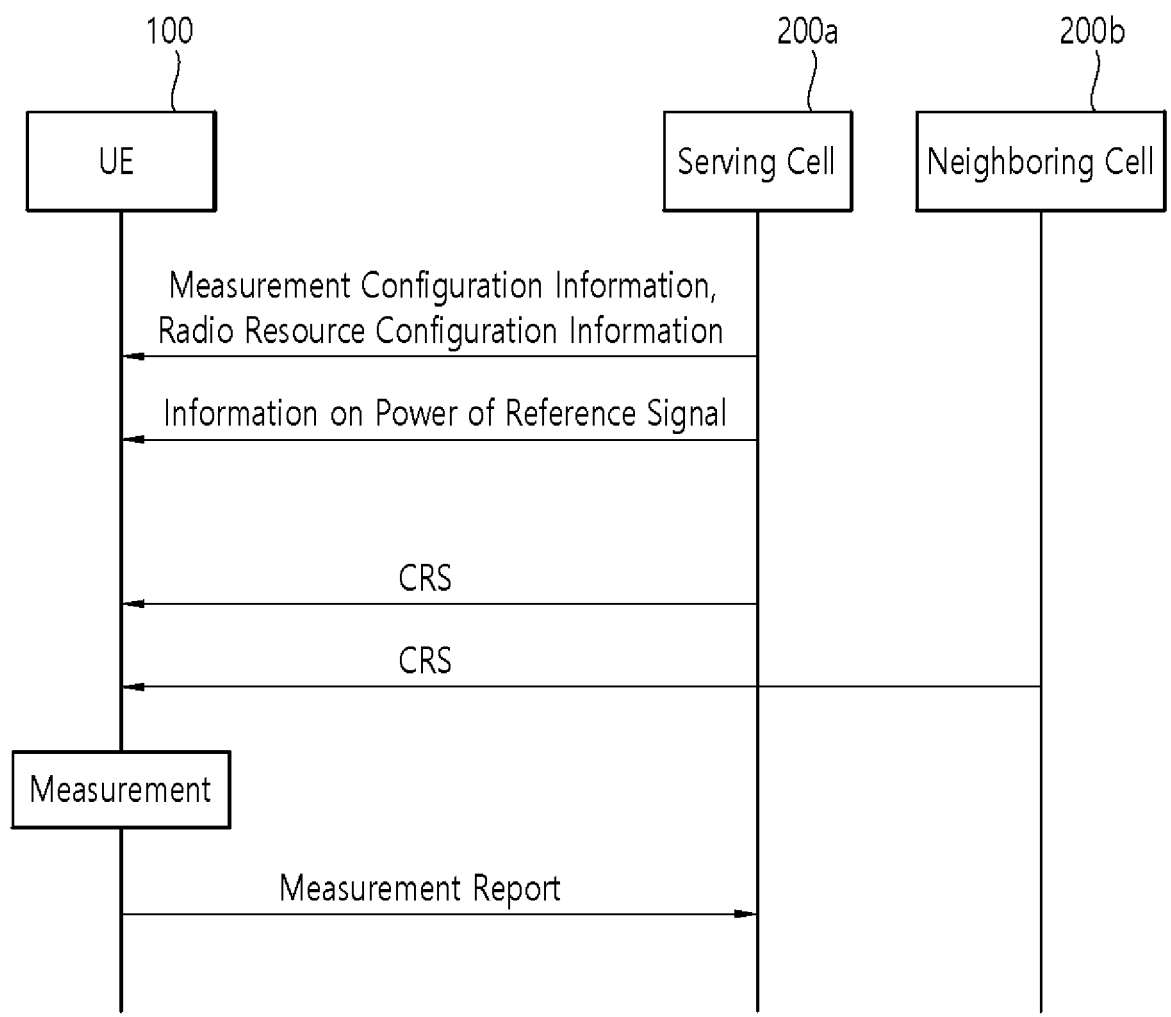
FIG. 7 illustrates a measurement and a measurement report.

FIG. 7 illustrates a measurement and a measurement report.

In wireless communication systems, it is indispensible to support mobility of the UE 100. Accordingly, the UE 100 continuously measures quality for serving cell that currently provides service and quality for a neighbor cell. The UE 100 reports the measurement result to a network on an appropriate time, and the network provides an optimal mobility to the UE through handover, and so on. Commonly, the measurement of such an object is called a radio resource management (RRM) measurement.

As we can know with reference to FIG. 8, if each of the serving cell 200a and the neighbor cell 200b transmit a cell-specific reference signal (CRS) to the UE 100, the UE 100 performs measurement through the CRS, and transmits the measurement result to the serving cell 200a.

In this time, the UE 100 may perform the measurement in the following three methods.

1) RSRP (reference signal received power): This represents an average reception power of all REs that carry the CRS which is transmitted through the whole bands. In this time, instead of the CRS, an average reception power of all REs that carry the CSI RS may also be measured.

2) RSSI (received signal strength indicator): This represents a reception power which is measured through the whole bands. The RSSI includes all of signal, interference and thermal noise.

3) RSRQ (reference symbol received quality): This represents a CQI, and may be determined as the RSRP/RSSI according to a measured bandwidth or a subband. That is, the RSRQ signifies a signal-to-noise interference ratio (SINR). Since the RSRP is unable to provide a sufficient mobility, in handover or cell reselection procedure, the RSRQ may be used instead of the RSRP.

The RSRQ may be obtained by RSSI/RSSP.

Meanwhile, the UE 100 receives a measurement configuration information element (IE) from the serving cell 100a for the measurement. The message that includes the measurement configuration information element (IE) is called a measurement configuration message. Here, the measurement configuration information element (IE) may be received through a RRC connection reconfiguration message. If the measurement result satisfies a report condition in the measurement configuration information, the UE reports the measurement result to a base station. The message that includes the measurement result is called a measurement report message.

The measurement configuration IE may include measurement object information. The measurement object information is information of an object that is going to perform a measurement by the UE. The measurement object includes at least one of an intra-frequency measurement object which is an object of intra-cell measurement, an inter-frequency measurement object which is an object of inter-cell measurement and an inter-RAT measurement object which is an object of inter-RAT measurement. For example, the intra-cell measurement object indicates a neighbor cell that has a frequency band which is identical to that of a serving cell, the inter-cell measurement object indicates a neighbor cell that has a frequency band which is different from that of a serving cell, and the inter-RAT measurement object indicates a neighbor cell of a RAT which is different from that of a serving cell.

Meanwhile, the UE 100 also receives a radio resource configuration information element (IE) as shown in the drawing.

The radio resource configuration dedicated IE is used to configure/modify/cancel radio bearers, to modify MAC configuration, etc. The radio resource configuration dedicated IE includes subframe pattern information. The subframe pattern information is information on a measurement resource restriction pattern on the time domain, for measuring RSRP and RSRQ of a primary cell (PCell).

<Carrier Aggregation (CA>

A carrier aggregation system is described hereinafter.

A carrier aggregation system aggregates a plurality of component carriers (CCs). A conventional definition of a cell is changed according to carrier aggregation. According to carrier aggregation, a cell may denote a combination of a downlink component carrier and an uplink component carrier or a downlink component carrier alone.

Further, in carrier aggregation, cells may be divided into a primary cell, a secondary cell, and a serving cell. A primary cell denotes a cell operating at a primary frequency, in which a UE performs an initial connection establishment procedure or a connection reestablishment procedure with a BS or which is designated as a primary cell in a handover procedure. A secondary cell denotes a cell operating at a secondary frequency, which is configured once RRC connection is established and is used to provide an additional radio resource.

Carrier aggregation systems may be divided into a contiguous carrier aggregation system in which aggregated carriers are contiguous and a non-contiguous carrier aggregation system in which aggregated carriers are spaced apart from each other. Hereinafter, when simply referring to a carrier aggregation system, it should be understood as including both a case where component carriers are contiguous and a case where component carriers are non-contiguous. Different numbers of component carriers may be aggregated for a downlink and an uplink. A case where the number of downlink component carriers and the number of uplink component carriers are the same is referred to as symmetric aggregation, and a case where the numbers are different is referred to as asymmetric aggregation.

When one or more component carriers are aggregated, component carriers to be aggregated may use the same bandwidths as adopted in an existing system for backward compatibility with the existing system. For example, the 3GPP LTE system supports bandwidths of 1.4 MHz, 3 MHz, 5 MHz, 10 MHz, 15 MHz, and 20 MHz, and the 3GPP LTE-A system may configure a broad band of 20 MHz or more only using the bandwidths of the 3GPP LTE system. Alternatively, instead of using the bandwidths of the existing system, new bandwidths may be defined to configure a broad band.

In order to transmit/receive packet data through a specific secondary cell in carrier aggregation, a UE first needs to complete configuration for the specific secondary cell. Here, configuration means that reception of system information necessary for data transmission/reception in a cell is completed. For example, configuration may include an overall process of receiving common physical-layer parameters necessary for data transmission and reception, media access control (MAC)-layer parameters, or parameters necessary for a specific operation in an RRC layer. A configuration-completed cell is in a state where packet transmission and reception is immediately possible upon receiving information indicating packet data may be transmitted.

A configuration-completed cell may be in an activated or deactivated state. Here, the activated state means that the cell performs data transmission or reception or is ready for data transmission or reception. A UE may monitor or receive a control channel (PDCCH) and a data channel (PDSCH) of an activated cell in order to identify resources (which may be a frequency or time) assigned thereto.

The deactivated state means that transmission or reception of traffic data is impossible and measurement or transmission/reception of minimal information is possible. A UE may receive system information (SI) necessary for receiving a packet from a deactivated cell. However, the UE does not monitor or receive a control channel (PDCCH) and data channel (PDSCH) of the deactivated cell in order to identify resources (which may be a frequency or time) assigned thereto.

<On/Off Time Mask>

Transmitters require a predetermined time to turn-off an output power as well as to turn-on an output power typically. This means that output power is not immediately turned on and turned off. Moreover, sudden transitions between the ON state and the OFF state may cause emission of unintended signals being emitted (i.e., unwanted emission). These signals should be limited to a specific level. Therefore, a transient period exists, during which the transmitter switches between the OFF state and the ON state. In addition, a different power allocation is configured on a subframe basis according to a physical layer channel (or signal) such as a PUSCH, a PUCCH, or an SRS on UL, and a transient period also exists when there is a power difference between consecutive channels.

Hereinafter, on/off time mask is described with reference to the drawing.

Figure 8A:
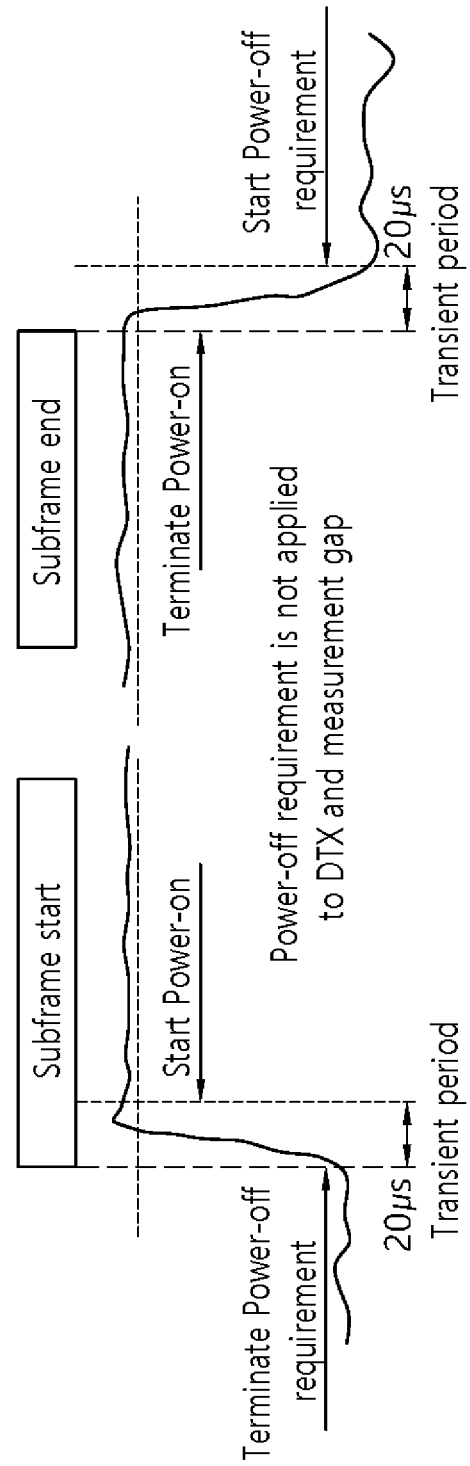
FIG. 8a is a diagram illustrating an exemplary general ON/OFF time mask.

FIG. 8a is a diagram illustrating an exemplary general ON/OFF time mask.

Referring to FIG. 8a, a general ON/OFF time mask is defined as an interval observed when output power is turned on from OFF power to ON power and an interval observed when output power is turned off from ON power to OFF power. This ON/OFF time mask may be generated in a Discontinued Transmission (DTX) period, a measurement gap, and the start or end of an adjacent/non-adjacent transmission.

An OFF power measurement period is defined as at least one subframe interval except for a transient period. In addition, ON power is defined as the average power of one subframe except for a transient period. While OFF power and ON power requirements should be satisfied respectively during an OFF power period and an ON power period, no requirement for UL transmission power is not defined for a transient period.

While the following description is given on the assumption that 20 μs is taken for an ON-OFF transient period, this is a maximum allowed duration and ON-OFF transition may occur faster depending on UE implementation.

Figure 8B:
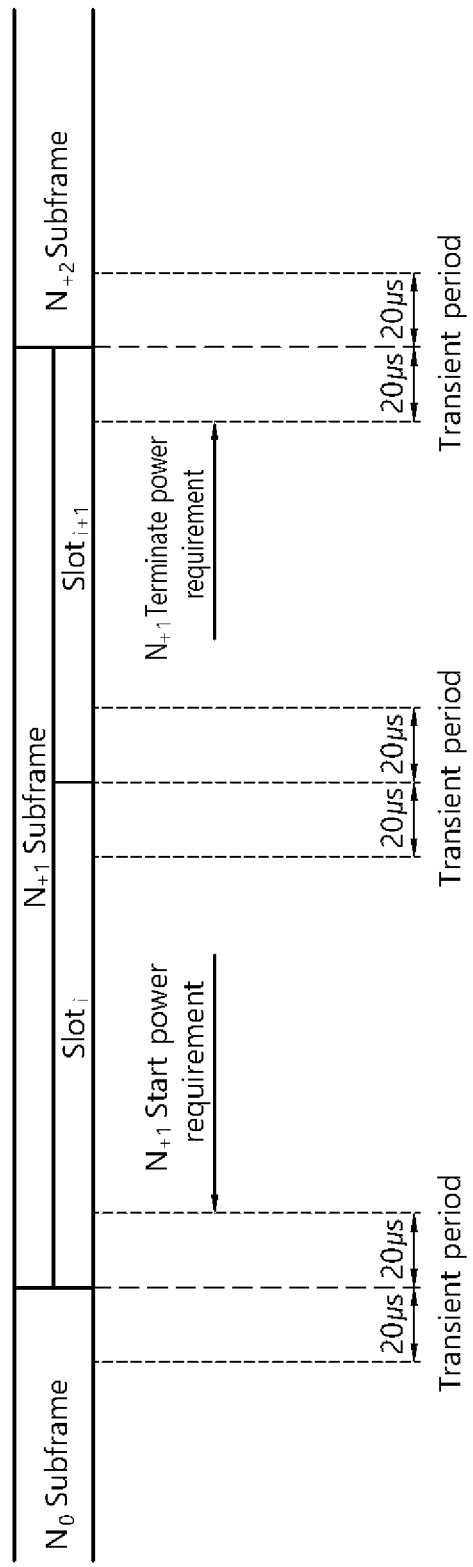
FIG. 8b is a diagram illustrating an exemplary time mask at a slot/subframe boundary.

FIG. 8b is a diagram illustrating an exemplary time mask at a slot/subframe boundary.

Referring to FIG. 8b, a subframe boundary time mask is defined as an interval observed between a previous or following subframe and a (reference) subframe. In the example illustrated in FIG. 8b, 40 μs transient periods (20 μs+20 μs) are set between subframe NO and subframe $N_{+1}$ and between subframe $N_{+1}$ and subframe N+2. A transient period at a slot boundary in a subframe is set only in the case of intra-subframe frequency hopping, and 20 μs is set at each of both sides of a slot boundary.

<D2D (Device to Device) Communication>

On the other hand, the D2D communication expected to be introduced in the next generation communication system will be described below.

Figure 9:
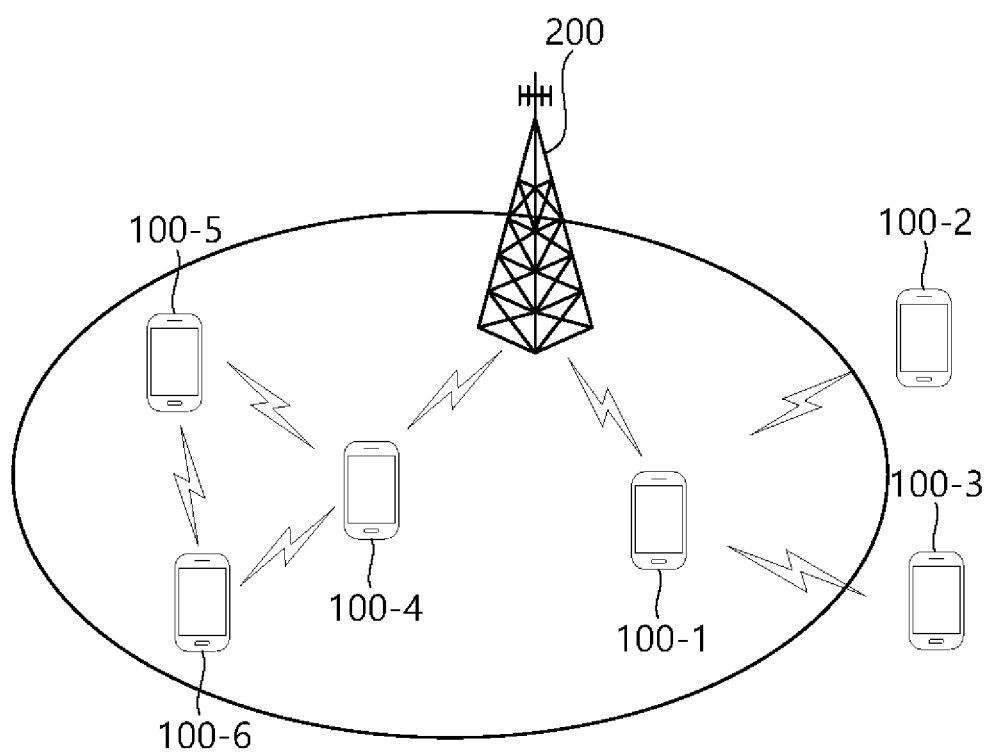
FIG. 9 illustrates the concept of D2D (Device to Device) communication expected to be introduced in the next generation communication system.

FIG. 9 illustrates the concept of D2D (Device to Device) communication expected to be introduced in the next generation communication system.

Due to the increase in user requirements for SNS (Social Network Service), communication between UEs physically close to each other, that is, D2D (Device to Device) communication has been required.

In order to reflect the above-described requirements, as illustrated in FIG. 9, it has been discussed that a method which is capable of directly communicating without intervention of the base station (eNodeB) 200, among UE #1 100-1, UE #2 100-2, and UE #3 100-3, or UE #4 100-4 UE #5 100-5, and UE #6 100-6. Of course, with the help of the base station (eNodeB) 200, it is possible to directly communicate between the UE #1 100-1 and the UE #4 100-4. Meanwhile, the UE #4 (100-4) may serve as a repeater for the UE #5 (100-5) and the UE #6 (100-6). Likewise, the UE #1 100-1 may serve as a repeater for UE #2 (100-2) and UE #3 (100-3) far from the cell center.

Meanwhile, D2D communication is also called Proximity Service (ProSe). The UE performing the proximity service is also referred to as a ProSe UE. Further, a link among UEs used in the D2D communication is also referred to as a side link. A frequency band that may be used for the side link is as follows.

TABLE 3

| Side link band | E-UTRA band | Transmission FUL_low-FUL_high | Reception FDL_low-FDL_high | Duplex mode |
|---|---|---|---|---|
| 2 | 2 | 1850 MHz-1910 MHz | 1850 MHz-1910 MHz | HD |
| 3 | 3 | 1710 MHz-1785 MHz | 1710 MHz-1785 MHz | HD |
| 4 | 4 | 1710 MHz-1755 MHz | 1710 MHz-1755 MHz | HD |
| 7 | 7 | 2500 MHz-2570 MHz | 2500 MHz-2570 MHz | HD |
| 14 | 14 | 788 MHz-798 MHz | 788 MHz-798 MHz | HD |
| 20 | 20 | 832 MHz-862 MHz | 832 MHz-862 MHz | HD |
| 26 | 26 | 814 MHz-849 MHz | 814 MHz-849 MHz | HD |
| 28 | 28 | 703 MHz-748 MHz | 703 MHz-748 MHz | HD |
| 31 | 31 | 452.5 MHz-457.5 MHz | 452.5 MHz-457.5 MHz | HD |
| 41 | 41 | 2496 MHz-2690 MHz | 2496 MHz-2690 MHz | HD |

Physical channels used for the sidelink are as follows.
PSSCH (Physical Sidelink Shared Channel)
PSCCH (Physical Sidelink Control Channel)
PSDCH (Physical Sidelink Discovery Channel)
PSBCH (Physical Sidelink Broadcast Channel)

Further, physical signals used in the side link are as follows.
DMRS (Demodulation Reference signal)
SLSS (Sidelink Synchronization signal)

The SLSS includes a PSLSS (primary sidelink synchronization signal) and a SSLSS (secondary sidelink synchronization signal).

Figure 10:
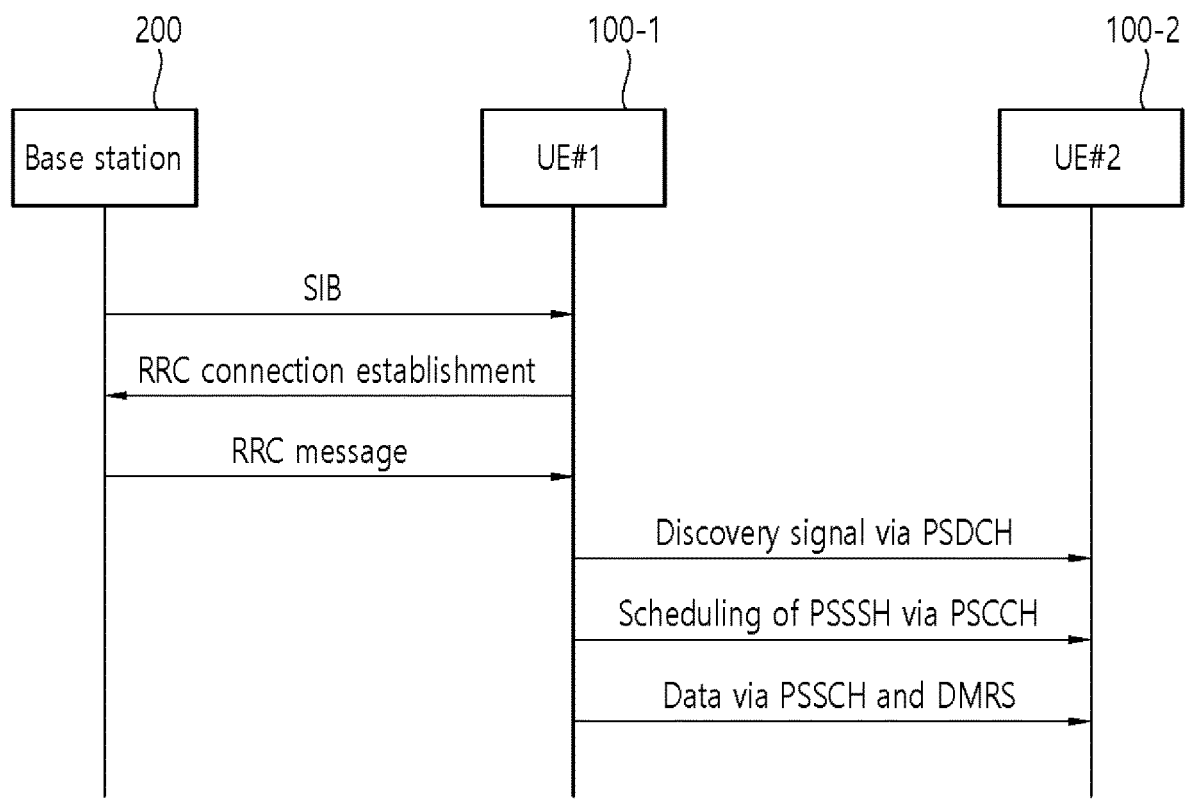
FIG. 10 illustrates an example of D2D communication or ProSe communication between UE #1 and UE #2 illustrated in FIG. 9.

FIG. 10 illustrates an example of D2D communication or ProSe communication between UE #1 and UE #2 illustrated in FIG. 9.

Referring to FIG. 10, the BS 200 broadcasts a System Information Block (SIB) in a cell.

The SIB may include information on resource pools related to D2D communication. Information on the resource pool related to the D2D communication may be divided into SIB type 18 and SIB type 19.

The SIB type 18 may include resource configuration information for D2D communication. Further, the SIB type 19 may include resource setting information related to a D2D discovery.

The SIB type 19 includes the discSyncConfig as shown below.

TABLE 4

| SIB Type 19 | |
| --- | --- |
| discSyncConfig | Indicates a configuration as to whether the UE is allowed to receive or transmit synchronization information. The base station (E-UTRAN) can set discSyncConfig when the UE intends to transmit synchronization information using dedicated signaling when it intends to use the dedicated signaling to allow |

The discSyncConfig includes SL-SyncConfig. The SL-SyncConfig includes configuration information for SLSS reception and SLSS transmission as shown in the following table.

TABLE 5

| SL-SyncConfig field description | |
| --- | --- |
| discSyncWindow | Also called a searching window. Indicates a synchronization window in which the UE expects the SLSS. The value can be set to w1 or w2. The value w1 represents 5 milliseconds, and the value w2 corresponds to the length of the normal CP divided by 2. |
| syncTxPeriodic | Indicates whether the UE transmits the SLSS once or periodically (e.g. every 40 ms) within each period of a discovery signal transmitted by the UE. For the periodic transmissions, the UE also transmits a MasterInformationBlock-SL. |
| syncTxThreshIC | Represents a threshold used when in coverage. If the RSRP value measured for the counterpart UE (recognized as a cell) selected for sidelink communication is lower than the threshold value, the UE may transmit the SLSS for the sidelink communication with the counterpart UE. |
| txParameters | Includes a parameter for a configuration for transmission. |

Meanwhile, the UE #1 100-1 located within the coverage of the base station 200 establishes an RRC connection with the base station.

Further, the UE #1 100-1 receives an RRC message, e.g., an RRC Connection Reconfiguration message from the BS 200. The RRC message includes a discovery configuration (hereinafter referred to as a discConfig). The discConfig includes configuration information for a discover resource pool (hereinafter referred to as a DiscResourcePool) for discovery. The DiscResourcePool includes information as shown in the following table.

TABLE 6

| DiscResourcePool | |
| --- | --- |
| discPeriod | May be noted as a discovery period, and is also called a PSDCH period, as a period of resources allocated in a cell for transmission/reception of a discovery message. The values may be rf32, rf64, rf128, rf256, rf512, rf1024, or the like. These values represent the number of radio frames. That is, when the value is rf32, it represents 32 radio frames. |
| numRepetition | Indicates the number of times that the subframe Bitmap is repeated for mapping to the subframe occurred in the discPeriod. The base station configures numRepetition and subframeBitmap so that the mapped subframe ca not exceed the discPeriod. |
| TF-ResourceConfig | Assigns a set of time/frequency resource used in the sidelink communication. |

The TF-ResourceConfig includes information as shown in the following table.

TABLE 7

```
SL-TF-ResourceConfig-r12 ::=    SEQUENCE {
    prb-Num-r12                     INTEGER (1..100),
    prb-Start-r12                   INTEGER (0..99),
    prb-End-r12                     INTEGER (0..99),
    offsetIndicator-r12             SL-OffsetIndicator-r12,
    subframeBitmap-r12              SubframeBitmapSL-r12
}
```

The SubframeBitmapSL is as in the following table.

TABLE 8

| | |
|---|---|
| SubframeBitmapSL | May be noted as discoverySubframeBitmap, and assingns a subframe bitmap indicating the resources used for the side link. The value may be designated as bs4, bs8, bs12, bs16, bs30, bs40, bs40, or the like. For example, the bs40 refers to a bit string length of 40. |

The SL-OffsetIndicator includes information as shown in the following table.

TABLE 9

| | |
|---|---|
| SL-OffsetIndicator | May be noted as discoveryOffsetIndicator, and indicates an offset in a first period of the resource pool within the SFN cycle. |
| SL-OffsetIndicatorSync | May be noted as SyncOffsetIndicator, indicates the relationship between subframes and SFNs containing synchronous resources based on an equation (SFN * 10 + Subframe Number) mod 40 = SL-OffsetIndicatorSync. |

Meanwhile, in order to discover whether there exists a proper neighboring UE for a D2D communication or a ProSe communication or in order to notify its own existence, the UE #1 100-1 may transmit a Discovery Signal through a PSDCH.

In addition, the UE #1 100-1 may transmit Sidelink control Information (SCI) including a scheduling assignment (SA) through a PSCCH. Further, the UE #1 100-1 may transmit a PSSCH including data based on the scheduling assignment (SA).

The PSCCH includes the SCI similar to the fact that a PDCCH includes DCI. The SCI includes information required for a counterpart UE to receive and demodulate a PSSCH.

The SCI may be divided into SCI format 0 and SCI format 1.

The SCI format 1 may include the following information.
  Frequency hopping flag
  Resource block allocation and hopping resource allocation
  Time resource pattern
  MCS (Modulation and Coding Scheme)
  Time advance indication
  Group destination ID Meanwhile, the SCI format 1 may include the following information.
  Priority: In the case that a Sidelink is used for Vehicle to everything (V2X) described below, the priority designates ProSe Per-Packet Priority (PPPP).
  Resource reservation
  Frequency resource location
  Time gap between an initial transmission and a retransmission
  MCS (Modulation and Coding Scheme)
  Retransmission index FIG. 11 illustrates an example that UE #2 shown in FIG. 9 selects a Relay UE.

Figure 11:
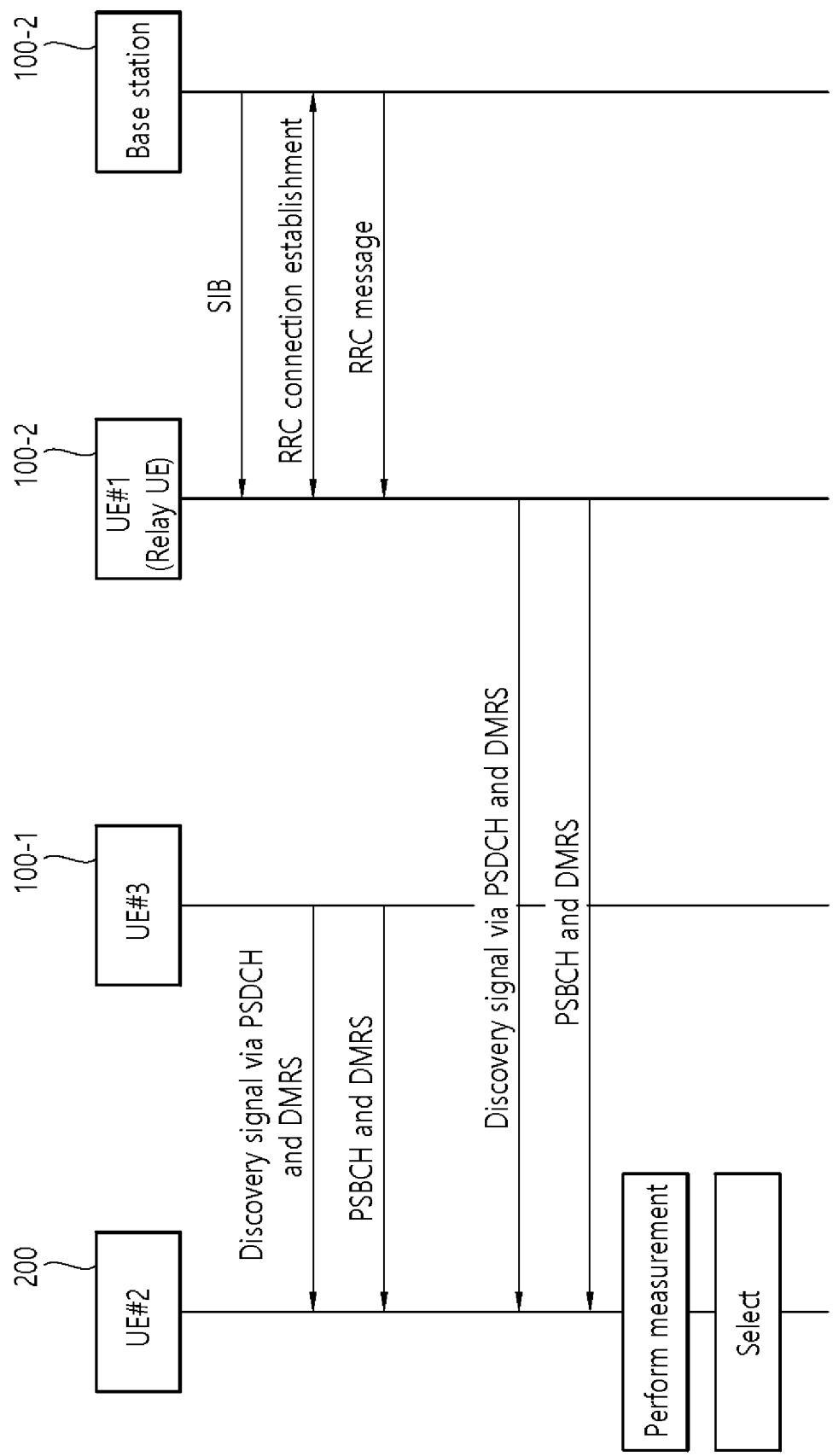
FIG. 11 illustrates an example that UE #2 shown in FIG. 9 selects a Relay UE.

Referring to FIG. 11 together with FIG. 9, UE #2 100-2 located outside of the coverage of a Base Station receives a discovery signal from neighboring UEs and a DMRS for demodulating the discovery signal, in order to performing a D2D communication with UE #1 100-1 that may operate as a Relay UE located within the coverage of the Base Station. In addition, the UE #2 100-2 receives a PSBCH from the neighboring UEs and a DMRS for demodulating the PSBCH.

Then, the UE #2 100-2 performs a measurement based on the received signals.

The measurement includes a measurement of a Sidelink Reference Signal Received Power (S-RSRP) and a measurement of a Sidelink Discovery Reference Signal Received Power (SD-RSRP).

Here, the S-RSRP means an average reception power on a Resource Element (RE) including a DMRS for demodulating a PSBCH which is received from center 6 PRBs. At this time, a power per RE is determined from the energy received from the part except the CP part of an OFDM symbol.

The SD-RSRP means an average reception power on an RE including a DMRS for demodulating a PSDCH in the case that a CRC examination is succeeded according to a successful decoding of the PSDCH including the discovery signal.

When the measurement is completed, the UE #2 100-2 selects he UE #1 100-1 that may operates as a Relay UE based on the result of the measurement, that is, the measurement result of the SD-RSRP.

<V2X (Vehicle-to-Everything)>

The contents for the D2D described above may also be applied to V2X (vehicle-to-everything). V2X is commonly called a communication technique through a vehicle and all interfaces. The implementation forms of V2X may be as below.

First, 'X' in V2X may be a vehicle. In this case, V2X may be represented as V2V (vehicle-to-vehicle), and means a communication between vehicles.

Figure 12:
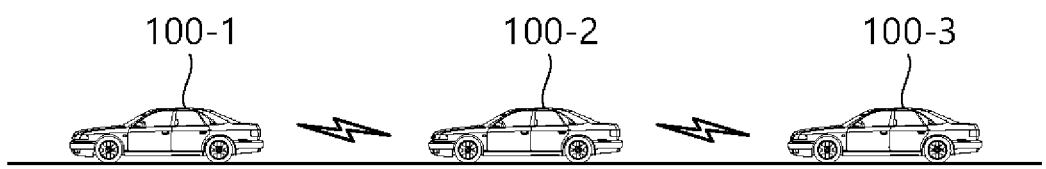
FIG. 12 is an exemplary diagram illustrating a concept of V2X.

FIG. 12 is an exemplary diagram illustrating a concept of V2X.

As it is known from FIG. 12, vehicles (i.e., wireless devices mounted on vehicles) 100-1, 100-2 and 100-3 may communicate with each other.

Meanwhile, 'X' in V2X may mean a person or a pedestrian. In this case, V2X may be represented as V2P (vehicle-to-person or vehicle-to-pedestrian). Here, the pedestrian is not necessarily limited to a person that moves by walking, but may also include a person riding a bicycle, a driver of a vehicle (of lower than a predetermined speed) or a passenger.

Alternatively, 'X' may be an infrastructure/network. In this case, V2X may be represented as V2I (vehicle-to-infrastructure) or V2N (vehicle-to-network), and may mean a communication between a vehicle and a ROADSIDE UNIT (RSU) or between a vehicle and a network. The ROADSIDE UNIT (RSU) may be a device that informs a traffic related infrastructure, for example, a speed. The ROADSIDE UNIT (RSU) may be implemented on a Base Station or a fixed UE.

The frequency band that may be used for the V2X communication is as below.

TABLE 10

| E-UTRA operation band | V2X operation band | V2X UE transmission FUL_low-FUL_high | V2X UE reception FDL_low-FDL_high | Duplex mode | Interface |
|---|---|---|---|---|---|
| 47 | 47 | 5855 MHz-5925 MHz | 5855 MHz-5925 MHz | TDD | PC5 |
| 3 | 3 | 1710 MHz-1785 MHz | 1805 MHz-1880 MHz | FDD | Uu |
| 7 | 7 | 2500 MHz-2570 MHz | 2620 MHz-2690 MHz | FDD | Uu |
| 8 | 8 | 880 MHz-915 MHz | 925 MHz-960 MHz | FDD | Uu |
| 39 | 39 | 1880 MHz-1920 MHz | 1880 MHz-1920 MHz | TDD | Uu |
| 41 | 41 | 2496 MHz-2690 MHz | 2496 MHz-2690 MHz | TDD | Uu |

Here, the PC5 interface means a Sidelink between V2X devices. In addition, the Uu interface means a link between a V2X device and a Base Station.

Meanwhile, the V2X communication may be performed with E-UTRA uplink/downlink simultaneously in a combination of the operation band represented in the following table.

TABLE 11

| V2X simultaneous configuration | Operation band | Interface | Uplink (UL) Operation band Received by Base Station Transmitted by UE FUL_low-FUL_high | Downlink (DL) Operation band Transmitted by Base Station Received by UE FDL_low-FDL_high | Duplex mode |
|---|---|---|---|---|---|
| V2X_3-47 | 3 | Uu | 1710 MHz-1785 MHz | 1805 MHz-1880 MHz | FDD |
|  | 47 | PC5 | 5855 MHz-5925 MHz | 5855 MHz 5925 MHz | TDD |
| V2X_7-47 | 7 | Uu | 2500 MHz-2570 MHz | 2620 MHz-2690 MHz | FDD |
|  | 47 | PC5 | 5855 MHz-5925 MHz | 5855 MHz 5925 MHz | TDD |
| V2X_8-47 | 8 | Uu | 880 MHz-915 MHz | 925 MHz-960 MHz | FDD |
|  | 47 | PC5 | 5855 MHz-5925 MHz | 5855 MHz 5925 MHz | TDD |
| V2X_39-47 | 39 | Uu | 1880 MHz-1920 MHz | 1880 MHz-1920 MHz | TDD |
|  | 47 | PC5 | 5855 MHz-5925 MHz | 5855 MHz 5925 MHz | TDD |
| V2X_41-47 | 41 | Uu | 2496 MHz 2690 MHz | 2496 MHz 2690 MHz | TDD |
|  | 47 | PC5 | 5855 MHz-5925 MHz | 5855 MHz 5925 MHz | TDD |

Meanwhile, in order for a V2X communication to operate with intra-band Multiple Component Carriers (MCC), the following operation bands are provided.

TABLE 12

| V2X MCC Band | V2X operation band | Interface |
|---|---|---|
| V2X_47 | 47 | PC5 |

<Description of the Present Disclosure>

As described above, a D2D communication (or ProSe communication) and a V2X communication have been proposed. However, previously, only the on/off time mask specialized to a D2D communication (or ProSe communication) is standardized, and an optimal on/off time mask corresponding to a DM-RS position modified in accordance with a V2X communication has not been proposed. Accordingly, an object of a disclosure of the present invention is to propose an on/off time mask which is optimized for a V2X operation. Before describing the on/off time mask, an RF structure of a UE is described with reference to the drawing.

Figure 13:
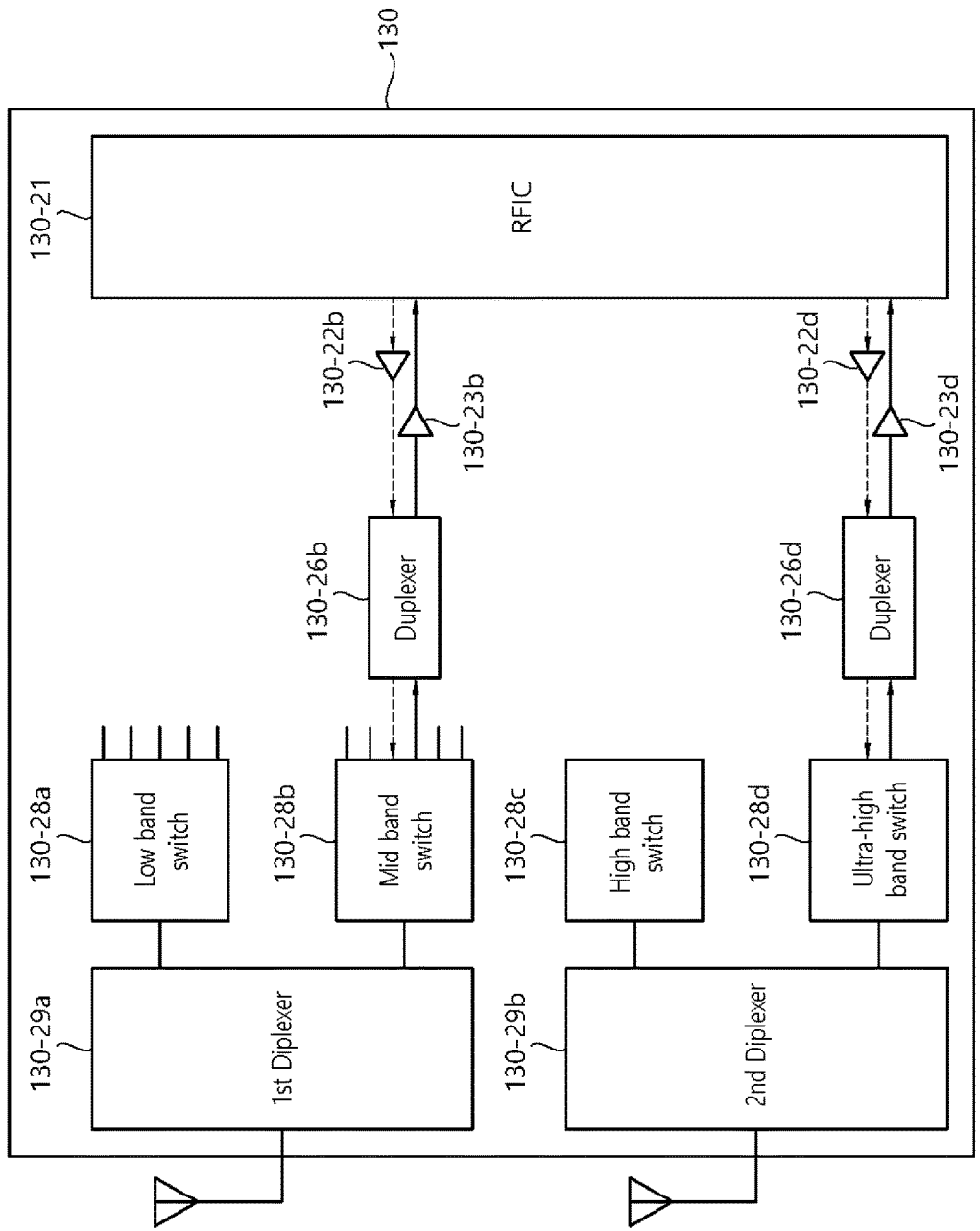
FIG. 13 illustrates an RF structure for an E-UTRA cellular communication and a V2X communication.

FIG. 13 illustrates an RF structure for an E-UTRA cellular communication and a V2X communication.

Referring to FIG. 13, it is shown that an RFIC 130-21 accommodating a plurality of RF chains, a first diplexer 130-29a connected to a first antenna, a second diplexer 130-29b connected to a second antenna, a switch 130-28a for distinguishing a plurality of low bands with being connected to the first diplexer 130-29a, a switch 130-28b for distinguishing a plurality of mid bands with being connected to the first diplexer 130-29a, a switch 130-28c for distinguishing a plurality of high bands with being connected to the second diplexer 130-29b, and a switch 130-28d for distinguishing a plurality of ultra-high bands with being connected to the second diplexer 130-29b.

A duplexer 130-26b is connected to the mid band switch 130-28b. A PA 130-22b and an LNA 130-23b are connected between the duplexer 130-26b and the RFIC 130-21.

Similarly, a duplexer 130-26d is connected to the ultra-high band switch 130-28d. A PA 130-22d and an LNA 130-23d are connected between the duplexer 130-26d and the RFIC 130-21.

The duplexer 130-26b connected to the mid band switch 130-28b may divide a transmission and a reception of operation band 3 for a V2X communication, for example.

Meanwhile, hereinafter, an on/off time mask for a D2D communication (or ProSe communication) and a V2X communication will be described.

I-1. Requirement of Transmit Off Power for D2D Communication (or ProSe Communication) and V2X Communication First, a Transmit OFF power represents an average power when a power of a transmitter is turned-off. When a UE does not perform a transmission in a subframe or during the duration in which a transmission of a UE is not allowed, the power of the transmitter is regarded as turned-off. However, during a DTX or a measurement gap, the power of the transmitter is not regarded as turned-off.

The Transmit OFF power is defined as an average power in the duration except a former duration in at least one subframe. The Transmit OFF power should not exceed the values defined in the table below.

TABLE 13

| | Channel bandwidth/Transmit OFF power/ Measurement bandwidth | | | | | |
|---|---|---|---|---|---|---|
| | 1.4 MHz | 3.0 MHz | 5 MHz | 10 MHz | 15 MHz | 20 MHz |
| Transmit OFF power | −50 dBm | | | | | |
| Measurement bandwidth | 1.08 MHz | 2.7 MHz | 4.5 MHz | 9.0 MHz | 13.5 MHz | 18 MHz |

In the case that a non-simultaneous transmission between an E-UTRA cellular uplink transmission and a PreSe Sidelink transmission is set to a UE, in the case that the UE does not access a serving cell in a ProSe carrier, and in the case that the UE does not have information for a geographical area in which the UE is located, the UE needs to satisfy the Transmit OFF power requirements in any time.

When the UE satisfies the following matters, the requirements needs to be applied.

- In the case that the UE accesses to a serving cell on the ProSe carrier, or
- In the case that the UE does not access to a serving cell on the ProSe carrier, and in the case that the UE receives a configuration of radio parameters related to a geographical area for a ProSe direct communication and a ProSe direct discovery, or
- In the case that the UE accesses to a serving cell on a carrier different from the ProSe carrier, and in the case that the UE is provided with radio parameters for a ProSe direct discovery on the ProSe carrier, or
- In the case that the UE accesses to a serving cell on a carrier different from the ProSe carrier, and in the case that the UE has a non-serving cell selected on the ProSe carrier that supports a ProSe direct discovery and/or a ProSe direct communication, Meanwhile, even in the case that a non-simultaneous transmission is set between an E-UTRA cellular uplink transmission and a ProSe Sidelink transmission to the UE, the UE needs to satisfy the requirements for the Transmit off power.

On the other hand, in the case that a simultaneous transmission between an E-UTRA cellular uplink transmission and a ProSe Sidelink transmission is set to the UE, the Transmit OFF power is defined as an average power for each carrier when a power of a transmitter is turn-off on all carriers. During measurement gap duration for ProSe and during transmission/reception gap duration, the power of the transmitter of the UE is not regarded as turned-off. The requirements for the Transmit OFF power need to be applied for each carrier.

In the case that a simultaneous transmission between an E-UTRA cellular uplink transmission and a V2X transmission is set to the UE, the Transmit OFF power is defined as an average power for each carrier when a power of a transmitter is turn-off on all carriers. During measurement gap duration for the V2X transmission and during transmission/reception gap duration, the power of the transmitter of the UE is not regarded as turned-off. The requirements for the Transmit OFF power need to be applied for each carrier.

I-2. On/Off Time Mask for D2D Communication (or ProSe Communication) and V2X Communication An additional requirement is required for on/off time mask optimized for a Sidelink operation or a V2X direct communication having different DM-RS position from a ProSe direct discovery and a ProSe direct communication.

In the case that a simultaneous transmission between an E-UTRA cellular uplink transmission and a ProSe Sidelink transmission is set to a UE, the on/off time mask described with reference to FIG. 8a and FIG. 8b needs to be applied to a general subframe for an E-UTRA cellular uplink transmission and the on/off time mask described with reference to FIG. 14 needs to be applied to all general subframes for ProSe Sidelink transmission.

I-2-1. On/Off Time Mask for D2D Communication (or ProSe Communication)

A general on/off time mask for D2D communication (or ProSe communication) is defined as a period observed when an output power is turned-on from OFF power to ON power in a subframe for PSDCH, PSCCH and PSSCH transmissions of D2D communication (or ProSe communication) and, reversely, a period observed when an output power is turned-off from ON power to OFF power. At this time, the last symbol in a subframe may be punctured for generating a guard period.

Figure 14:
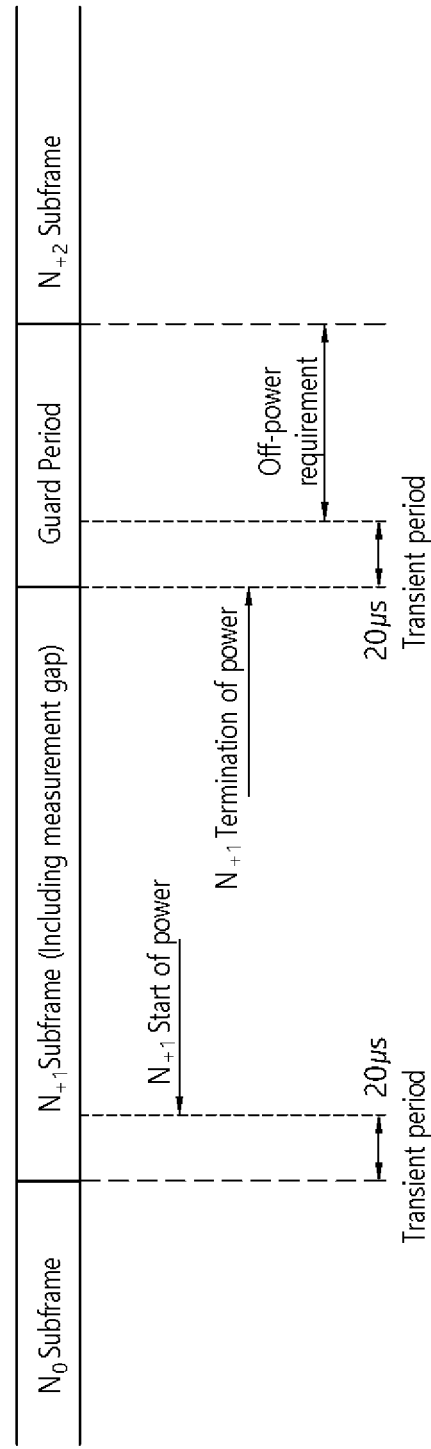
FIG. 14 illustrates a general on/off time mask of D2D communication (or ProSe communication).

FIG. 14 illustrates a general on/off time mask of D2D communication (or ProSe communication).

Referring to FIG. 14, a transient period is existed for 20 μs after $N_{+1}$ subframe is started. And, the last symbol in a subframe is punctured and a guard period is generated. A transient period is existed for 20 μs after the guard period is started. The OFF power measurement period is defined as at least one subframe duration except the transient period in $N^{+1}$ subframe. In addition, ON power is defined as an average power during a period except the transient period in one subframe.

I-2-2. On/Off Time Mask for PSSS/SSSS of D2D Communication (or ProSe Communication)

The on/off time mask for a Primary Sidelink Synchronization signal (PSLSS or PSSS) and a Secondary Sidelink Synchronization signal (SSLSS or SSSS) is defined as a period observed when an output power is turned-on from OFF power to ON power for PSSS/SSSS which is not multiplexed with a PSBCH in a subframe and, reversely, a period observed when an output power is turned-off from ON power to OFF power.

Figure 15A:
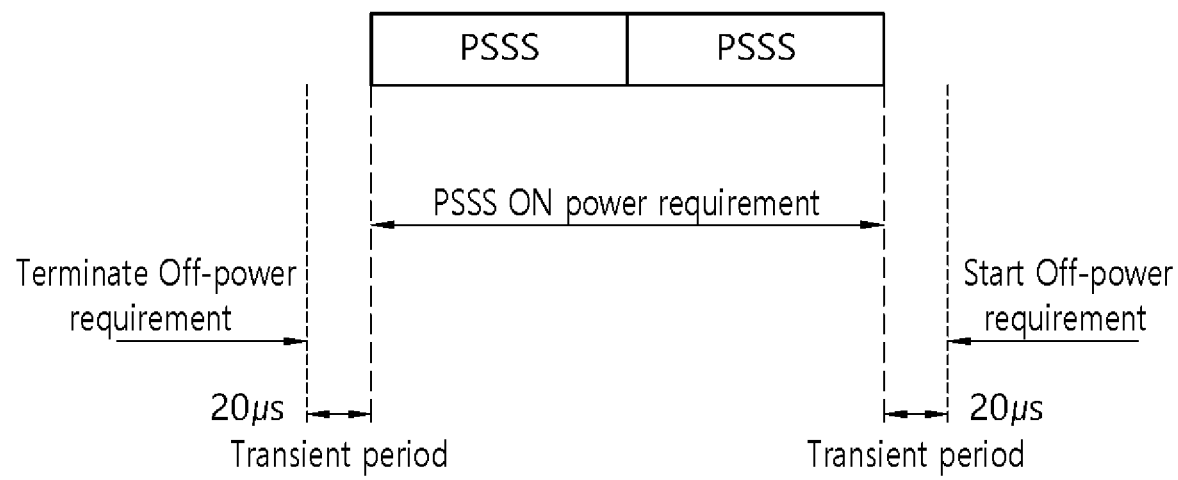
FIG. 15a illustrates an on/off time mask for PSSS which is not time-multiplexed with a PSBCH based on normal CP.

FIG. 15a illustrates an on/off time mask for PSSS which is not time-multiplexed with a PSBCH based on normal CP.

Referring to FIG. 15a, in a normal CP based subframe, before a first PSSS symbol is started, a first transient period is existed for 20 μs. And, the on-power requirement of PSSS needs to be satisfied during a first PSSS symbol and a second PSSS symbol. A second transient period is also existed for 20 μs from a termination of the second PSSS symbol. The off-power requirement is terminated before the first transient period located before the first PSSS symbol and started after the second transient period located after the second PSSS symbol.

Figure 15B:
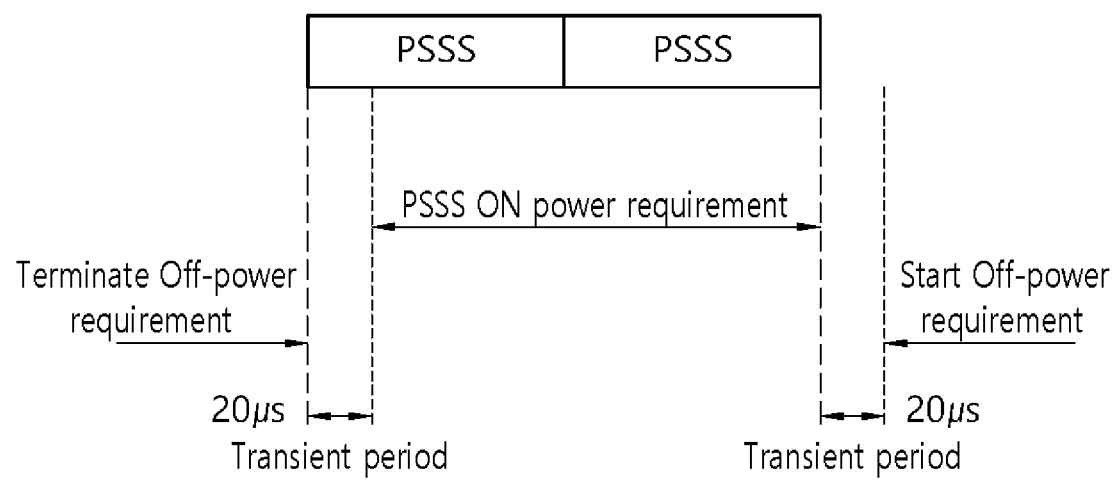
FIG. 15b illustrates an on/off time mask for PSSS which is not time-multiplexed with a PSBCH based on extended CP.

FIG. 15b illustrates an on/off time mask for PSSS which is not time-multiplexed with a PSBCH based on extended CP.

Referring to FIG. 15b, in an extended CP based subframe, after a first PSSS symbol is started, a first transient period is existed for 20 μs. And, the on-power requirement of PSSS needs to be satisfied during a first PSSS symbol period and a second PSSS symbol period excluding the first transient period. A second transient period is also existed for 20 μs from a termination of the second PSSS symbol. The off-power requirement is terminated before start of the first PSSS symbol and started after the second transient period located after the second PSSS symbol.

Figure 15C:
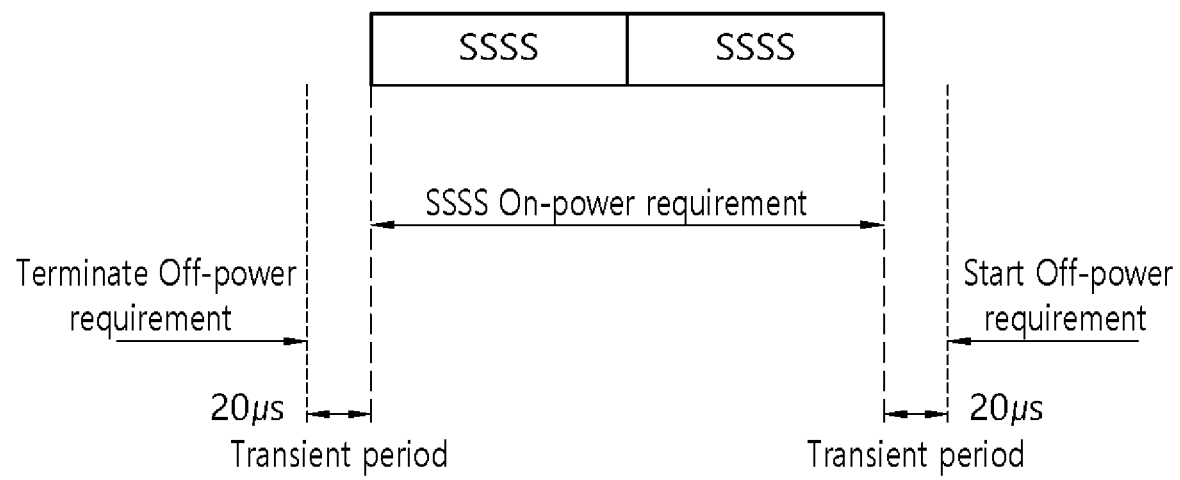
FIG. 15c illustrates an on/off time mask for SSSS which is not time-multiplexed with a PSBCH.

FIG. 15c illustrates an on/off time mask for SSSS which is not time-multiplexed with a PSBCH.

Referring to FIG. 15c, in a subframe, before a first SSSS symbol is started, a first transient period is existed for 20 μs. And, the on-power requirement of SSSS needs to be satisfied during a first PSSS symbol period and a second PSSS symbol period. A second transient period is also existed for 20 μs from a termination of the second SSSS symbol. The off-power requirement is terminated before start of the first transient period located before the first SSSS symbol and started after the second transient period located after the second SSSS symbol.

I-2-3. On/Off Time Mask for PSSS/SSSS/PSBCH of D2D Communication (or ProSe Communication)

The on/off time mask for PSSS/SSSS/PSBCH is defined as a period observed between an SSSS symbol and an adjacent PSSS/PBSCH symbol in a subframe. The last symbol in the subframe is punctured for generating a guard period.

Figure 16A:
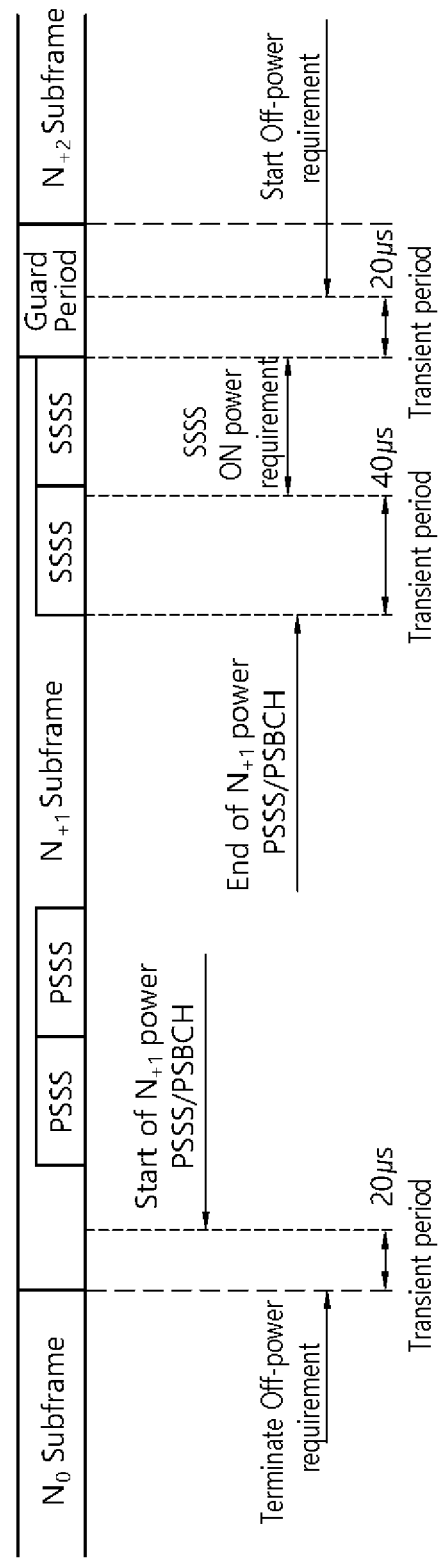
FIG. 16a illustrates an on/off time mask for PSSS/SSSS/PSBCH based on normal CP.

FIG. 16a illustrates an on/off time mask for PSSS/SSSS/PSBCH based on normal CP.

Referring to FIG. 16a, $N_{+1}$ subframe includes a first PSSS symbol, a second PSSS symbol, a first SSSS symbol and a second SSSS symbol. In the starting point of the $N_{+1}$ subframe, the requirement for off-power is terminated. After start of the $N_{+1}$ subframe, a first transient period is existed for 20 μs. After the first transient period, power-on is started for PSSS/PSBCH of the $N_{+1}$ subframe, and the power-on is terminated before start of the first SSSS symbol. However, a second transient period is existed for 40 μs after the first SSSS symbol. This causes a problem that a transient period is existed in the SSSS for protecting a DM-RS in a PSBCH, and in this case, a part of the SSSS is unable to decode a signal accurately due to the transition of a transmission power. Accordingly, in the case that a position of a DM-RS is located in a place, not in the symbol right before the SSSS like V2X, a modification therefor is needed. The on-power requirement needs to be satisfied for SSSS before a guard period after the second transient period. The last symbol in the subframe is punctured for generating a guard period. A third transient period is existed for 20 μs after start of the guard period.

Figure 16B:
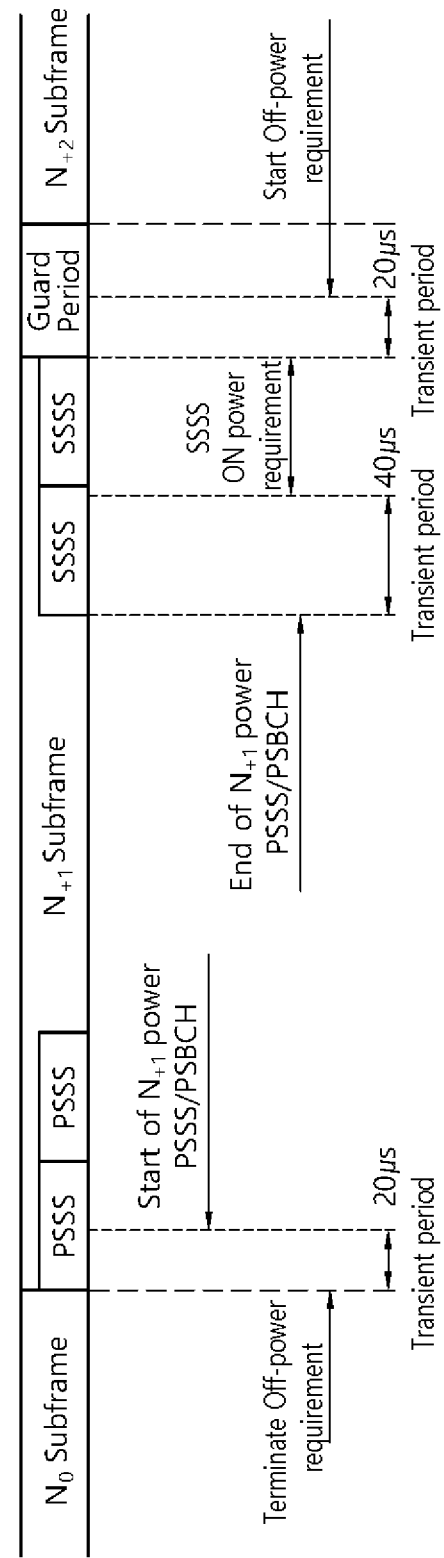
FIG. 16b illustrates an on/off time mask for PSSS/SSSS/PSBCH based on extended CP.

FIG. 16b illustrates an on/off time mask for PSSS/SSSS/PSBCH based on extended CP.

Referring to FIG. 16a, $N_{+1}$ subframe includes a first PSSS symbol, a second PSSS symbol, a first SSSS symbol and a second SSSS symbol. The PSSS symbol is started in accordance of a starting point of the $N_{+1}$ subframe. In the starting point of the $N_{+1}$ subframe, the requirement for off-power is terminated. After start of the $N_{+1}$ subframe, a first transient period is existed for 20 μs. After the first transient period, power-on is started for PSSS/PSBCH of the $N_{+1}$ subframe, and the power-on is terminated before start of the first SSSS symbol. A second transient period is existed for 40 μs after the first SSSS symbol. The on-power requirement needs to be satisfied for SSSS before a guard period after the second transient period. The last symbol in the subframe is punctured for generating a guard period. A third transient period is existed for 20 μs after start of the guard period.

I-2-4. On/Off Time Mask for PSSS/SSSS/PSBCH of V2X Communication

For V2X communication, the general on/off time mask for PSDCH, PSCCH and PSSCH transmissions for ProSe communication described in section I-2-1, the on/off time mask for PSSS/SSSS described in section I-2-2, and an additional on/off time mask described in this section need to be applied.

In the case that a simultaneous transmission between an E-UTRA cellular uplink transmission and a V2X transmission is set to a UE, all of the on/off time mask described with reference to FIG. 8a and FIG. 8b, the on/off time mask for PSSS/SSSS described in section I-2-2, and the on/off time mask described in this section need to be applied. However, as described above, the on/off time mask for PSSS/SSSS/PSBCH needs to be optimized in accordance with a V2X transmission design. Accordingly, it is proposed as shown in FIGS. 17a and 17b.

Figure 17A:
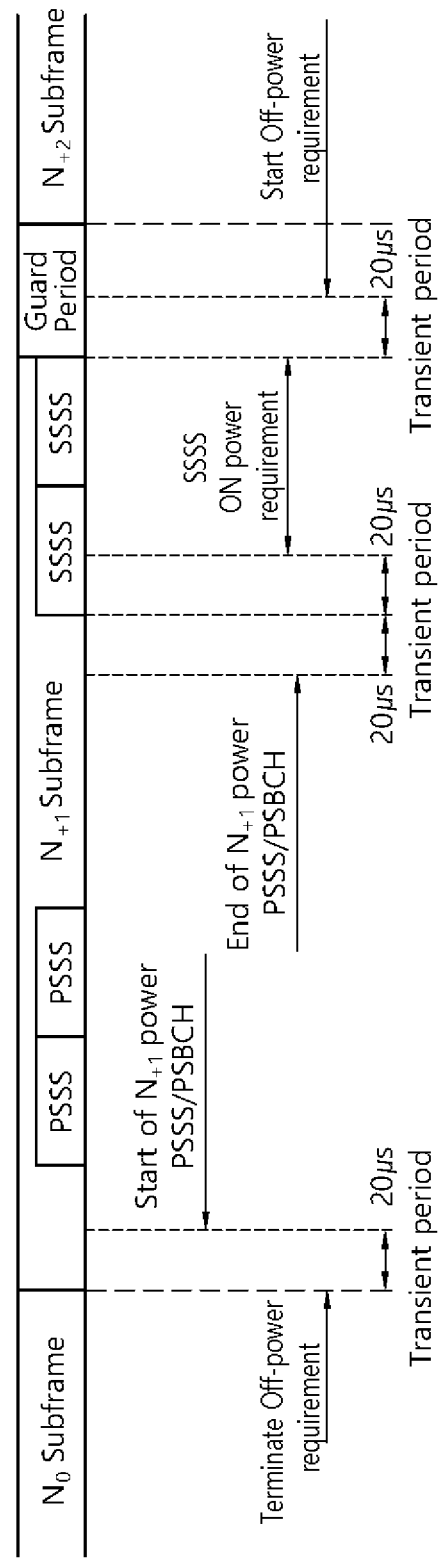
FIG. 17a illustrates an on/off time mask for PSSS/SSSS/PSBCH in a V2X communication based on normal CP.

FIG. 17a illustrates an on/off time mask for PSSS/SSSS/PSBCH in a V2X communication based on normal CP.

The on/off time mask for PSSS/SSSS/PSBCH is defined as a period observed between an SSSS symbol and an adjacent PSSS/PBSCH symbol in a subframe. The last symbol in the subframe is punctured for generating a guard period. Referring to FIG. 17a, $N_{+1}$ subframe includes a first PSSS symbol, a second PSSS symbol, a first SSSS symbol and a second SSSS symbol. In the starting point of the $N_{+1}$ subframe, the requirement for off-power is terminated. After start of the $N_{+1}$ subframe, a first transient period is existed for 20 μs. After the first transient period, power-on is started for PSSS/PSBCH of the $N_{+1}$ subframe, and the power-on is terminated before start of the first SSSS symbol for 20 μs. This is because a DM-RS symbol is shifted by one symbol inside, different from the D2D in which a DM-RS symbol position is adjacent to SSSS, and accordingly, a transient period, the turn-off period 20 μs before SSSS, is shifted toward a PSBCH so as to protect SSSS. In other words, power for the PSSS/PSBCH is turned-on after the first transient period and turned-off in 20 μs before start of the first SSSS symbol. A second transient period is existed for 40 μs before and after the first SSSS symbol. The on-power requirement needs to be satisfied for SSSS before a guard period after the second transient period. The last symbol in the subframe is punctured for generating a guard period. A third transient period is existed for 20 μs after start of the guard period.

Figure 17B:
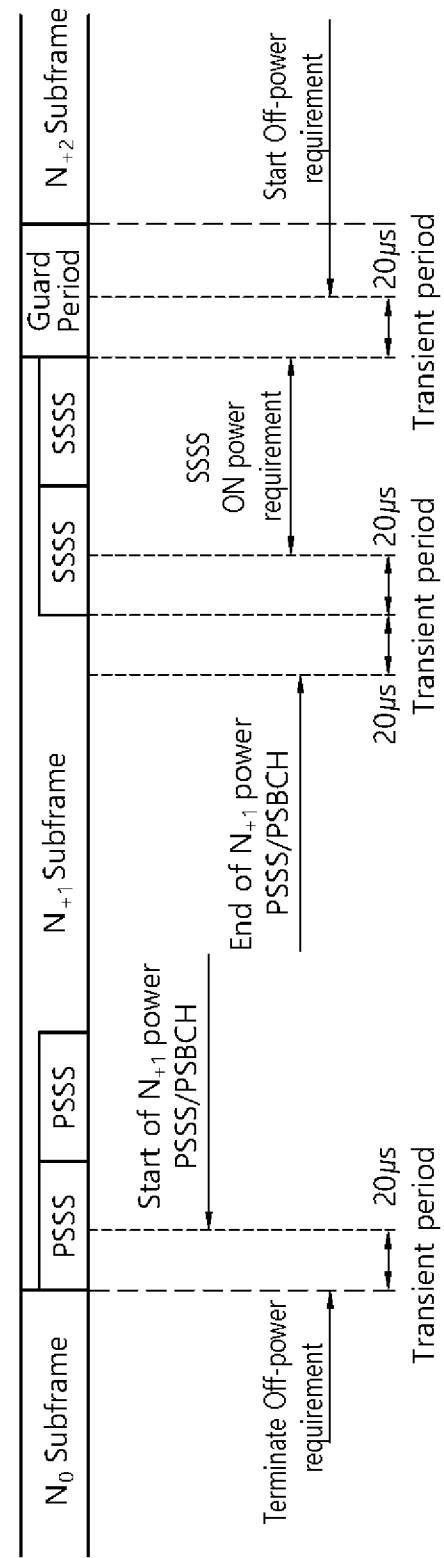
FIG. 17b illustrates an on/off time mask for PSSS/SSSS/PSBCH in a V2X communication based on extended CP.

FIG. 17b illustrates an on/off time mask for PSSS/SSSS/PSBCH in a V2X communication based on extended CP.

Referring to FIG. 17b, $N_{+1}$ subframe includes a first PSSS symbol, a second PSSS symbol, a first SSSS symbol and a second SSSS symbol. The PSSS symbol is starded in accordance with the starting point of the $N_{+1}$ subframe. In the starting point of the $N_{+1}$ subframe, the requirement for off-power is terminated. After start of the $N_{+1}$ subframe, a first transient period is existed for 20 μs. After the first transient period, power-on is started for PSSS/PSBCH of the $N_{+1}$ subframe, and the power-on is terminated before start of the first SSSS symbol for 20 μs. In other words, power for the PSSS/PSBCH is turned-on after the first transient period and turned-off in 20 μs before start of the first SSSS symbol. A second transient period is existed for 40 μs before and after the first SSSS symbol. The on-power requirement needs to be satisfied for SSSS before a guard period after the second transient period. The last symbol in the subframe is punctured for generating a guard period. A third transient period is existed for 20 μs after start of the guard period.

The embodiments of the present invention described so far may be implemented by various means. For example, the embodiments of the present invention may be implemented by hardware, firmware, software or a combination thereof. This is particularly described with reference to a drawing.

Figure 18:
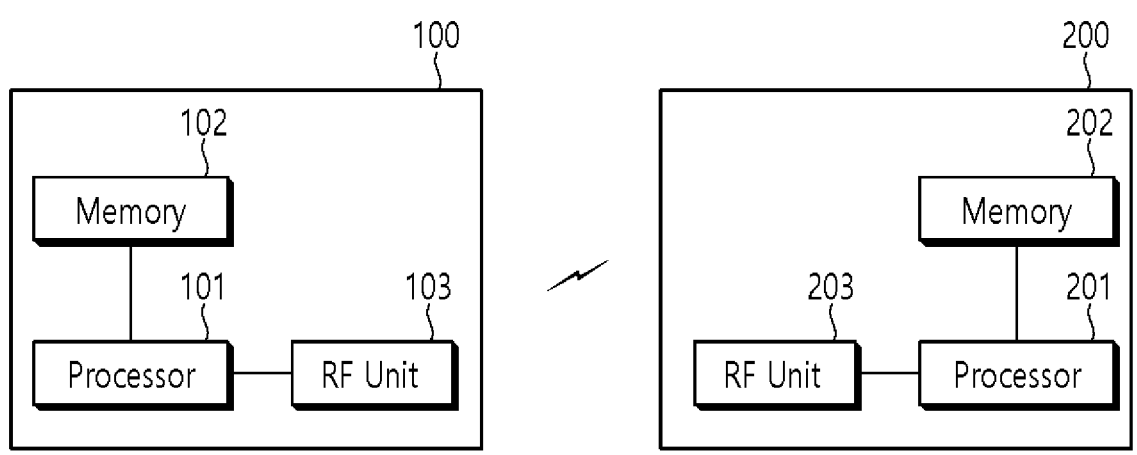
FIG. 18 is a block diagram illustrating the wireless communication system in which the present disclosure is implemented.

FIG. 18 is a block diagram illustrating the wireless communication system in which the present disclosure is implemented.

A BS 200 includes a processor 210, a memory 220 and an RF (radio frequency) unit 230. The memory 220 is connected to the processor 210, and stores various types of information for driving the processor 210. The RF unit 230 is connected to the processor 210, and transmits and/or receives radio signals. The processor 210 implements proposed functions, processes and/or methods. In the embodiment described above, the operation of the BS may be implemented by the processor 210.

A UE 100 includes a processor 110, a memory 120 and an RF unit 130. The memory 120 is connected to the processor 110, and stores various types of information for driving the processor 110. The RF unit 130 is connected to the processor 110, and transmits and/or receives radio signals. The processor 110 implements proposed functions, processes and/or methods.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for applying on/off power time mask, the method performed by a vehicle to everything (V2X) communication terminal and comprising:
    applying an on/off power time mask for a primary sidelink synchronization signal (PSSS), a secondary sidelink synchronization signal (SSSS) and a physical broadcast channel (PBCH),
    wherein the on/off power time mask specifies an observation period between SSSS and adjacent PSSS symbols in a subframe,
    wherein a power of the PSSS is turned off at a 20 μs before a starting point of a first SSSS symbol in the subframe, and
    wherein a power of the SSSS is turned on at 20 μs after the starting point of the first SSSS symbol in the subframe.

2. The method of claim 1,
    wherein the power of the PSSS is turned on at 20 μs after a starting point of the subframe.

3. The method of claim 1,
    wherein the power of the SSSS is turned on until an ending point of a second SSSS symbol in the subframe.

4. The method of claim 1,
    wherein a last symbol in the subframe is punctured to create a guard period.

5. A vehicle to everything (V2X) communication terminal for applying on/off power time mask, comprising:
    a transceiver; and
    a processor configured to control the transceiver,
    wherein the processor applies an on/off power time mask for a primary sidelink synchronization signal (PSSS), a secondary sidelink synchronization signal (SSSS) and a physical broadcast channel (PBCH),
    wherein the on/off power time mask specifies an observation period between SSSS and adjacent PSSS symbols in a subframe,
    wherein a power of the PSSS is turned off at a 20 μs before a starting point of a first SSSS symbol in the subframe, and
    wherein a power of the SSSS is turned on at 20 μs after the starting point of the first SSSS symbol in the subframe.

6. The V2X communication terminal of claim 5,
    wherein the power of the PSSS is turned on at 20 μs after a starting point of the subframe.

7. The V2X communication terminal of claim 5,
    wherein the power of the SSSS is turned on until an ending point of a second SSSS symbol in the subframe.

8. The V2X communication terminal of claim 5,
    wherein a last symbol in the subframe is punctured to create a guard period.

* * * * *